United States Patent
Onishi et al.

(10) Patent No.: US 10,821,366 B2
(45) Date of Patent: Nov. 3, 2020

(54) GAME SYSTEM, GAME CONTROL DEVICE, AND INFORMATION STORAGE MEDIUM

(71) Applicant: KONAMI DIGITAL ENTERTAINMENT CO., LTD., Tokyo (JP)

(72) Inventors: Takashi Onishi, Tokyo (JP); Chris Tilston, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 355 days.

(21) Appl. No.: 15/403,158

(22) Filed: Jan. 10, 2017

(65) Prior Publication Data

US 2017/0144072 A1  May 25, 2017

Related U.S. Application Data

(63) Continuation of application No. PCT/JP2015/069056, filed on Jul. 1, 2015.

(30) Foreign Application Priority Data

Jul. 11, 2014 (JP) ................... 2014-143730

(51) Int. Cl.
*A63F 13/847* (2014.01)
*A63F 13/812* (2014.01)
(Continued)

(52) U.S. Cl.
CPC ............ *A63F 13/812* (2014.09); *A63F 13/25* (2014.09); *A63F 13/35* (2014.09); *A63F 13/46* (2014.09); *A63F 13/847* (2014.09); *A63F 13/798* (2014.09)

(58) Field of Classification Search
CPC .......... A63F 13/20; A63F 13/22; A63F 13/40; A63F 13/55; A63F 13/56; A63F 13/847
See application file for complete search history.

(56) References Cited

U.S. PATENT DOCUMENTS

2002/0143790 A1* 10/2002 Qian ................. G06F 16/40
2004/0009816 A1*  1/2004 Miller ............... A63F 13/12
                                                           463/42
(Continued)

FOREIGN PATENT DOCUMENTS

| CN | 101951998 A | 1/2011 |
| CN | 102065959 A | 5/2011 |

(Continued)

OTHER PUBLICATIONS

English Translation of the International Preliminary Report on Patentability for PCT/JP2015/069056 dated Jan. 26, 2017.
(Continued)

*Primary Examiner* — James S. McClellan
(74) *Attorney, Agent, or Firm* — HEA Law PLLC

(57) ABSTRACT

A game system comprising at least one processor configured to: execute a sport game based on a first character group operated by a user; set any one of a plurality of roles as a role to be played by the user in a match; acquire basic locations of first characters based on formation data on the first character group; set a plurality of the first characters corresponding to each of the plurality of roles based on the basic locations of the first characters; select a plurality of operation subject candidates from among the first characters based on the role of the user and a setting of the plurality of the roles; switch an operation subject of the user among the plurality of operation subject candidates during the match; and cause the operation subject of the user to act based on the user's operation during the match.

9 Claims, 19 Drawing Sheets

(51) Int. Cl.
*A63F 13/25* (2014.01)
*A63F 13/35* (2014.01)
*A63F 13/46* (2014.01)
*A63F 13/798* (2014.01)

(56) References Cited

U.S. PATENT DOCUMENTS

2011/0118019 A1* 5/2011 Kondo ............... A63F 13/10
 463/31
2011/0124386 A1 5/2011 Kondo et al.

FOREIGN PATENT DOCUMENTS

JP 2010-022493 A 2/2010
JP 2010-022494 A 2/2010

OTHER PUBLICATIONS

<URL:https://web.archive.org/web/20130328113204/http://www.blaugrana.com/aprentiz/posicion.htm> It is known that order is set for players based on a distance from a predetermined position in a sport which is played between a first group and a second group.
<URL:https://web.archive.org/web/20130606072158/http://www.chuden.co.jp/corporate/activity/sports/rugby/rug_about/index.html> It is known that order is set for players based on a distance from a predetermined position in a sport which is played between a first group and a second group.
English Translation of International Search Report for PCT/JP2015/069056 dated Aug. 4, 2015.
Office Action dated Sep. 4, 2019, for corresponding CN Patent Application No. 201580037261.3.

* cited by examiner

FIG.5

| ROLE | POSITION | PLAYER ID | PLAYER NAME |
|---|---|---|---|
| ATTACK | FW1 | P111 | K |
| | MF1 | P106 | F |
| MIDFIELD | MF2 | P107 | G |
| | MF3 | P108 | H |
| | MF4 | P109 | I |
| | MF5 | P110 | J |
| DEFENCE | DF1 | P102 | B |
| | DF2 | P103 | C |
| | DF3 | P104 | D |
| | DF4 | P105 | E |

FIG.6

| USER | ROLE |
|---|---|
| U-A | ATTACK |
| U-B | MIDFIELD |
| U-C | DEFENCE |

FIG.10

ROLE-SPECIFIC STATS

| ROLE | ATTACK | MIDFIELD | DEFENCE |
|---|---|---|---|
| EVALUATION POINT | 6.5 | 6.0 | 6.0 |
| SCORE | 2 | 0 | 0 |
| ASSIST | 16% | 26% | 13% |
| NUMBER OF SHOTS (NUMBER OF SHOT-ON-GOALS) | 5(3) | 5(1) | 2(0) |
| NUMBER OF PASSES (NUMBER OF SUCCESSFUL PASSES) | 12(10) | 20(18) | 16(15) |
| NUMBER OF CROSSES | 1 | 5 | 2 |
| NUMBER OF FOULS (NUMBER OF OFFSIDES) | 3(1) | 3(1) | 5(0) |
| NUMBER OF INTERCEPTIONS | 3 | 5 | 6 |
| NUMBER OF TOUCHES | 26 | 56 | 36 |
| DRIBBLING DISTANCE | 563m | 689m | 356m |
| NUMBER OF TACKLES (NUMBER OF SUCCESSFUL TACKLES) | 4(2) | 5(4) | 10(8) |

FIG.12

TBL101

| NUMBER OF USERS | FORMATION | | | | ROLE | | | | | | | | | |
|---|---|---|---|---|---|---|---|---|---|---|---|---|---|---|
| | FW | MF | DF | | 1 | 2 | 3 | 4 | 5 | 6 | 7 | 8 | 9 | 10 |
| 3 | 1 | 4 | 5 | → | A | A | M | M | M | D | D | D | D | D |
| | 1 | 5 | 4 | → | A | A | M | M | M | M | D | D | D | D |
| | 2 | 3 | 5 | → | A | A | M | M | M | D | D | D | D | D |
| | 2 | 4 | 4 | → | A | A | M | M | M | M | D | D | D | D |
| | 2 | 5 | 3 | → | A | A | M | M | M | M | M | D | D | D |
| | 3 | 2 | 5 | → | A | A | A | M | M | D | D | D | D | D |
| | 3 | 3 | 4 | → | A | A | A | M | M | M | D | D | D | D |
| | 3 | 4 | 3 | → | A | A | A | M | M | M | M | D | D | D |
| | 3 | 5 | 2 | → | A | A | A | M | M | M | M | M | D | D |
| | 4 | 1 | 5 | → | A | A | A | A | M | M | D | D | D | D |
| | 4 | 2 | 4 | → | A | A | A | A | M | M | D | D | D | D |
| | 4 | 3 | 3 | → | A | A | A | A | M | M | M | D | D | D |
| | 4 | 4 | 2 | → | A | A | A | A | M | M | M | M | D | D |
| | 5 | 1 | 4 | → | A | A | A | A | M | M | D | D | D | D |
| | 5 | 2 | 3 | → | A | A | A | A | A | M | M | D | D | D |
| | 5 | 3 | 2 | → | A | A | A | A | A | M | M | M | D | D |
| | ... | ... | ... | ... | ... | ... | ... | ... | ... | ... | ... | ... | ... | ... |
| 2 | 1 | 4 | 5 | → | A | A | A | A | A | D | D | D | D | D |
| | 1 | 5 | 4 | → | A | A | A | A | A | D | D | D | D | D |
| | 2 | 3 | 5 | → | A | A | A | A | A | D | D | D | D | D |
| | 2 | 4 | 4 | → | A | A | A | A | A | D | D | D | D | D |
| | 2 | 5 | 3 | → | A | A | A | A | A | D | D | D | D | D |
| | 3 | 2 | 5 | → | A | A | A | A | A | D | D | D | D | D |
| | 3 | 3 | 4 | → | A | A | A | A | A | D | D | D | D | D |
| | 3 | 4 | 3 | → | A | A | A | A | A | D | D | D | D | D |
| | 3 | 5 | 2 | → | A | A | A | A | A | D | D | D | D | D |
| | ... | ... | ... | ... | ... | ... | ... | ... | ... | ... | ... | ... | ... | ... |

FIG.13

TBL102

| PLAYER ID | PARTICIPATION FLAG | POSITION | OPERATION SUBJECT CANDIDATE FLAG | | | OPERATION SUBJECT FLAG | | | BALL KEEPING FLAG | ... |
|---|---|---|---|---|---|---|---|---|---|---|
| | | | D-A | D-B | D-C | U-A | U-B | U-C | | |
| P101 | 1 | GK | 0 | 0 | 0 | 0 | 0 | 0 | 0 | ... |
| P102 | 1 | DF1 | 0 | 0 | 1 | 0 | 0 | 1 | 0 | ... |
| P103 | 1 | DF2 | 0 | 0 | 1 | 0 | 0 | 0 | 0 | ... |
| ... | ... | ... | ... | ... | ... | ... | ... | ... | ... | ... |
| P106 | 1 | MF1 | 1 | 0 | 0 | 1 | 1 | 0 | 1 | ... |
| P107 | 2 | — | 0 | 0 | 0 | 0 | 0 | 0 | 0 | ... |
| ... | ... | ... | ... | ... | ... | ... | ... | ... | ... | ... |
| P111 | 1 | FW1 | 1 | 0 | 0 | 0 | 0 | 0 | 0 | ... |
| ... | ... | ... | ... | ... | ... | ... | ... | ... | ... | ... |
| P113 | 1 | MF2 | 0 | 1 | 0 | 0 | 1 | 0 | 0 | ... |
| ... | ... | ... | ... | ... | ... | ... | ... | ... | ... | ... |
| P118 | 0 | — | 0 | 0 | 0 | 0 | 0 | 0 | 0 | ... |
| P201 | 1 | GK | | 0 | | | 0 | | 0 | ... |
| ... | ... | ... | ... | ... | ... | ... | ... | ... | ... | ... |
| P218 | 0 | — | | 0 | | | 0 | | 0 | ... |

FIG.15

| ORDER RANK | PLAYER ID | PLAYER NAME | POSITION |
|---|---|---|---|
| 1 | P111 | K | FW1 |
| 2 | P106 | F | MF1 |
| 3 | P108 | G | MF3 |
| 4 | P107 | H | MF2 |
| 5 | P110 | I | MF5 |
| 6 | P109 | J | MF4 |
| 7 | P103 | B | DF2 |
| 8 | P102 | C | DF1 |
| 9 | P105 | D | DF4 |
| 10 | P104 | E | DF3 |

GAME SYSTEM, GAME CONTROL DEVICE, AND INFORMATION STORAGE MEDIUM

CROSS-REFERENCE TO RELATED APPLICATION

The present disclosure contains subject matter related to that disclosed in Japanese Patent Application JP2014-143730 filed in the Japan Patent Office on Jul. 11, 2014 and International Patent Application PCT/JP2015/069056 filed in the Japan Patent Office on Jul. 1, 2015, the entire contents of which are hereby incorporated by reference.

BACKGROUND OF THE INVENTION

1. Field of the Invention

The present invention relates to a game system, a game control device, and an information storage medium.

2. Description of the Related Art

A sport game, e.g., a soccer game, a basketball game, an ice hockey game, or an American football game, is configured so that an operation subject of a user is switched among characters belonging to one of teams (character groups).

In JP2010-022493A, there is described a technology for allowing, in such a sport game as described above, a user to select a plurality of operation subject candidates from among characters belonging to a character group and switching the operation subject of the user among a plurality of game characters selected as the operation subject candidates. For example, there is described a technology for allowing the user to select characters assigned to a specific position (role), e.g., a forward, from among the characters belonging to one of character groups as the operation subject candidates and switching the operation subject of the user among the characters assigned to the specific position.

SUMMARY OF THE INVENTION

Some of such sport games as described above have a function that allows a user to freely change a formation of a character group. In the sport game having such a function, for example, it is possible to set a formation formed without including a specific position, e.g., a forward (for example, formation formed of midfielders, defenders, and a goalkeeper). When the formation formed without including a specific position is set, the sport game that allows a character assigned to the specific position (role), e.g., a forward, to be selected as an operation subject candidate may cause such an inconvenience that there exists no operation subject candidate of the user.

The present invention has been made in view of the above-mentioned problem, and has an object to provide a game system, a game control device, and an information storage medium that are capable of avoiding such an inconvenience that there exists no operation subject candidate of a user when a plurality of characters corresponding to a specific role are set as operation subject candidates of the user.

In order to solve the above-mentioned problem, according to one embodiment of the present invention, there is provided a game system including at least one processor configured to: execute a sports game based on a first character group operated by a user and a second character group; set any one of a plurality of roles as a role to be played by the user in a match; acquire basic locations of first characters included in the first character group based on formation data on the first character group; set a plurality of the first characters corresponding to each of the plurality of roles based on the basic locations of the first characters; select a plurality of operation subject candidates from among the first characters based on the role of the user and a setting of the plurality of the roles; switch an operation subject of the user among the plurality of operation subject candidates during the match; and cause the operation subject of the user to act based on the user's operation during the match.

According to one embodiment of the present invention, there is provided a game control device including at least one processor configured to: execute a sport game based on a first character group operated by a user and a second character group; set any one of a plurality of roles as a role to be played by the user in a match; acquire basic locations of first characters included in the first character group based on formation data on the first character group; set a plurality of the first characters corresponding to each of the plurality of roles based on the basic locations of the first characters; select a plurality of operation subject candidates from among the first characters based on the role of the user and a setting of the plurality of the roles.

BRIEF DESCRIPTION OF THE DRAWINGS

FIG. 5 is a diagram for illustrating a correspondence relationship with information on a player character assigned to a role.

FIG. 6 is a diagram for illustrating an example of information on the role set for each of a plurality of users.

FIG. 10 is a diagram for illustrating an example of a role evaluation result screen.

FIG. 12 is a diagram for illustrating an example of a character role setting control table.

FIG. 13 is a diagram for illustrating an example of a game situation data table.

FIG. 15 is a diagram for illustrating information on the order set for the characters.

DESCRIPTION OF THE EMBODIMENTS

Now, modes for carrying out the present invention (hereinafter referred to as "embodiments") are described with reference to the accompanying drawings. In the accompanying drawings, like components or corresponding components are denoted by like reference symbols, and repetitive descriptions may be omitted.

1. Overall Configuration of Game System 1

Figure 1:
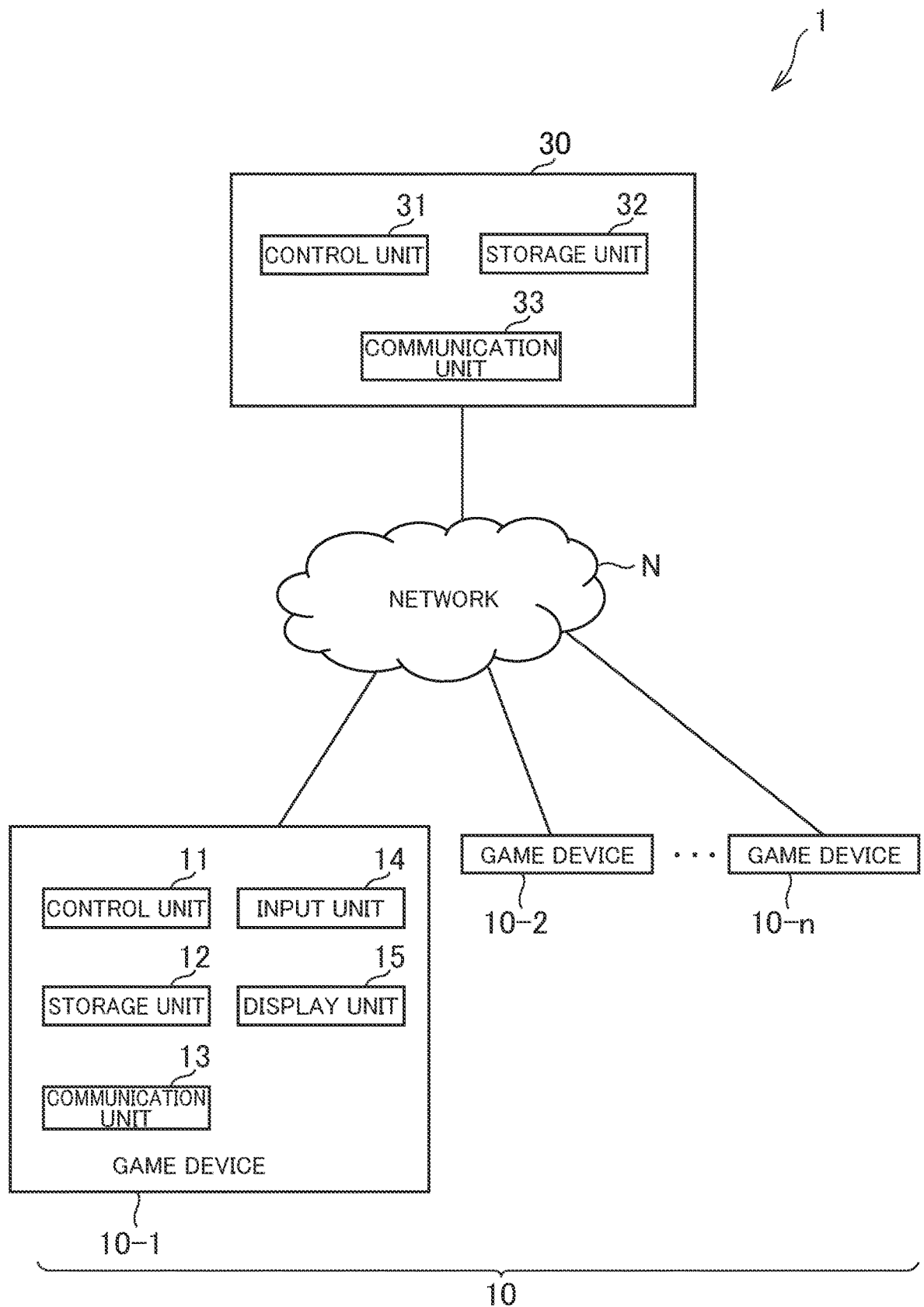
FIG. 1 is a diagram for illustrating an overall configuration of a game system.

FIG. 1 is a diagram for illustrating an overall configuration of a game system 1 according to an embodiment of the present invention. As illustrated in FIG. 1, the game system 1 according to this embodiment includes a game server 30 (example of a game control device) and a plurality of game devices 10-1 to 10-n (where n represents an integer equal to or larger than 2). The game server 30 and game devices 10 are connected to a network N. Therefore, data communications can be mutually conducted between the game server 30 and the game devices 10. In the following description, contents common to the game devices 10-1 to 10-n may be described using the notation of the game device 10.

[1.1. Hardware Configuration of Game Server 30]

The game server 30 is implemented by, for example, a server computer. As illustrated in FIG. 1, the game server 30 includes a control unit 31, a storage unit 32, and a communication unit 33.

The control unit 31 includes, for example, at least one microprocessor, and executes processing based on an operating system or another program. The storage unit 32 includes a main storage unit (for example, RAM) and an auxiliary storage unit (for example, hard disk drive or solid-state drive). The communication unit 33 is configured to conduct the data communications through the network N.

[1.2. Hardware Configuration of Game Device 10]

The game device 10 is a computer to be used by a user. In this embodiment, the game device 10 is a computer to be used by the user to play a game. The game device 10 is implemented by, for example, a home-use game machine (stationary game machine), a portable game machine, an arcade game machine, a mobile phone (including a smartphone), a portable information terminal (including a tablet computer), a desktop computer, or a laptop computer.

As illustrated in FIG. 1, the game device 10 includes a control unit 11, a storage unit 12, a communication unit 13, an input unit 14, and a display unit 15. The input unit 14 and the display unit 15 may not be built into the game device 10, and may be provided as an external device connected to the game device 10. For example, when the game device 10 is implemented by a home-use game machine, a game controller serving as the input unit 14 and a display device serving as the display unit 15 are each configured as an external device for the game device 10.

The control unit 11 includes, for example, at least one microprocessor, and executes processing based on an operating system or another program. The storage unit 12 includes a main storage unit (for example, RAM) and an auxiliary storage unit (for example, hard disk drive or solid-state drive). The communication unit 13 is configured to conduct the data communications through the network N. The input unit 14 includes, for example, a game controller, a key, a lever, a touch panel, or a mouse, and is configured to allow the user to conduct an input operation, e.g., a game operation. The input unit 14 may be configured to allow the user to conduct the game operation through voice or gesture. The display unit 15 is, for example, a liquid crystal display panel or an organic EL display, and is configured to display a screen based on an instruction issued by the control unit 11.

A program or data is supplied to the game server 30 or game device 10 through, for example, the network N. The game server 30 or the game device 10 may include a component configured to read a program or data stored on an information storage medium (for example, optical disc or memory card). Then, the program or data may be supplied to the game server 30 or the game device 10 through the information storage medium.

2. Outline of Game Executed in Game System 1

In the game system 1, a game to be joined by a plurality of users relating to the plurality of game devices 10 is executed. For example, a game of a sport match played between a first character group operated in cooperation by a plurality of users and a second character group is executed. In the following description, a soccer game configured so that a soccer match is played between a first team and a second team is taken as an example of such a sport game as described above.

The following description presupposes that three users U-A, U-B, and U-C who operate the game devices 10-1 to 10-3, respectively, operate the first team in cooperation while the computer operates the second team. The wording "the users U-A, U-B, and U-C operate the first team in cooperation" means that player characters belonging to the first team are operated by the users U-A, U-B, and U-C. Further, the second team may be operated by one or more users.

The soccer game is achieved when, for example, the game server 30 and each of the game devices 10 communicate to/from each other. That is, the control unit 31 of the game server 30 executes processing based on data received from the respective game devices 10 and the program and data stored in the storage unit 32. Further, the control unit 11 of each game device 10 executes processing based on data received from the game server 30 and the program and data stored in the storage unit 12. The soccer game is thus achieved.

Figure 2:
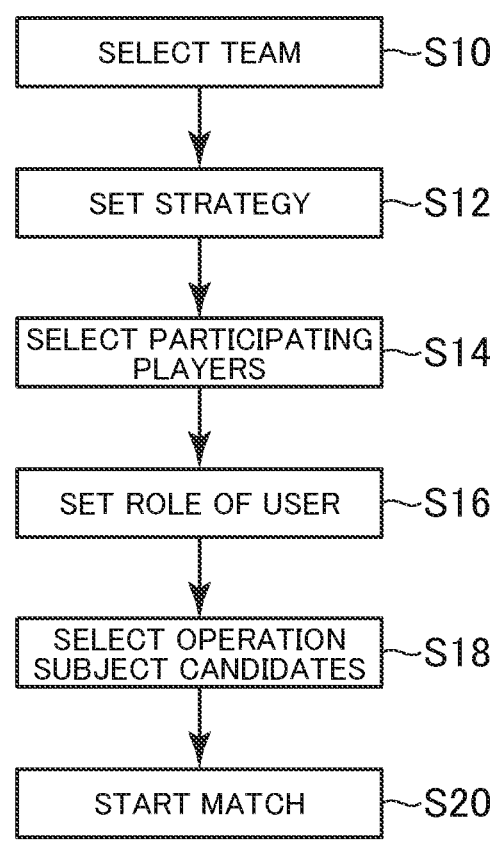
FIG. 2 is a diagram for illustrating an example of a flow of setting processing conducted before a match of a soccer game is started.

First, a description is made of a flow of setting processing conducted before a match is started in the soccer game. FIG. 2 is a diagram for illustrating an example of the flow of the setting processing conducted before the match of the soccer game is started. As illustrated in FIG. 2, first, a representative user (for example, the user U-A) selected from among the plurality of users who operate the first team selects a team (first team) operated by themselves from among a plurality of teams provided in advance (S10).

Subsequently, the user sets a strategy for the selected team (hereinafter referred to as "own team") (S12). In Step S12, the control unit 11 displays a screen for setting the strategy for the own team on the display unit 15. For example, the user sets a formation of the own team on the screen. That is, the user selects any one of a plurality of formations provided in advance, to thereby determine an arrangement of a forward (FW), a midfielder (MF), and a defender (DF).

Figure 3:
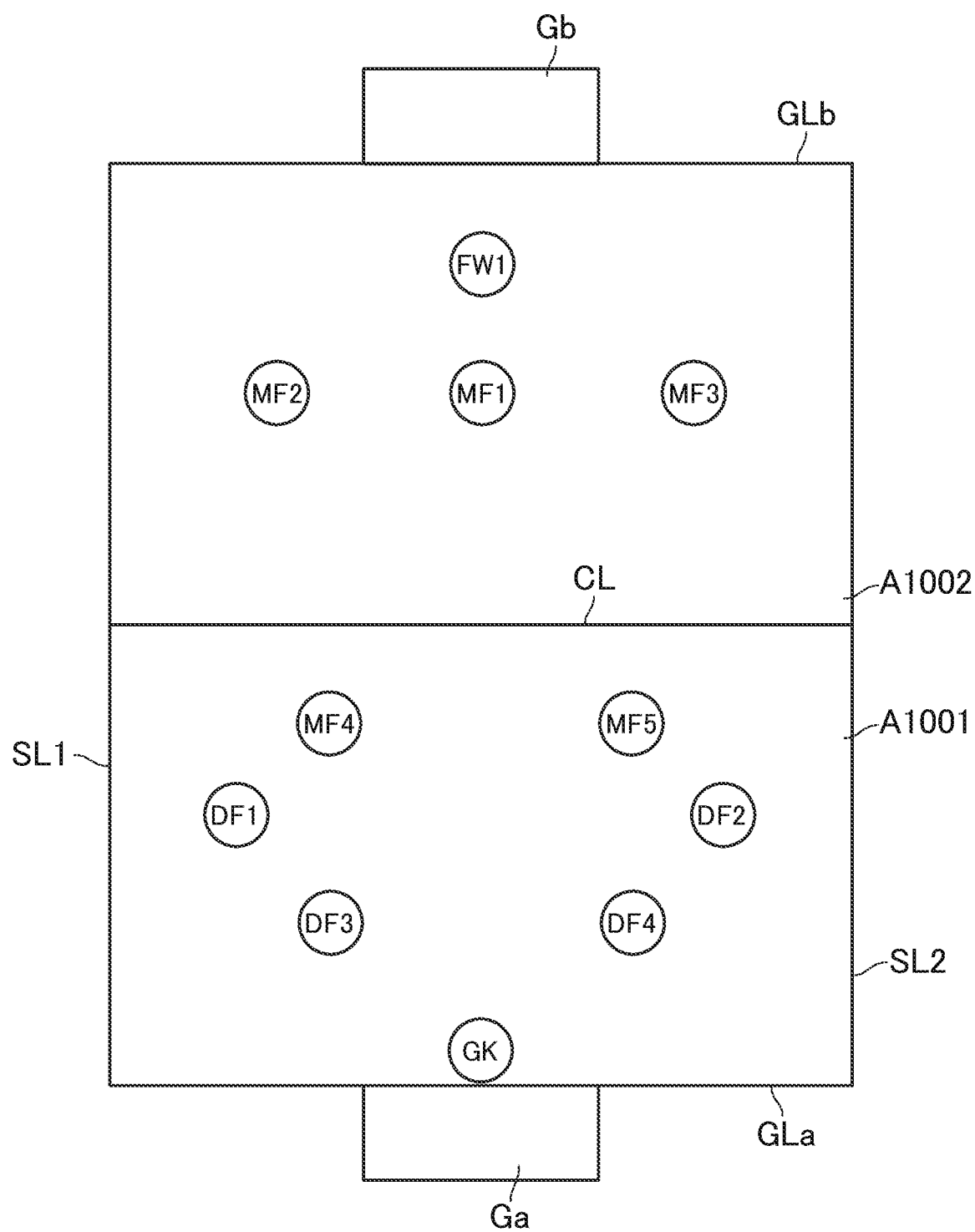
FIG. 3 is a diagram for illustrating an example of a formation.

FIG. 3 is a diagram for illustrating an example of the formation. The formation illustrated in FIG. 3 is a formation generally called "4-5-1", in which four defenders (DF1, DF2, DF3, and DF4), five midfielders (including three attacking midfielders (MF1, MF2, and MF3) and two defensive midfielders (MF4 and MF5)), one forward (FW1), and a goalkeeper (GK) are arranged.

On the screen, a designation of any one of the plurality of formations provided in advance may be received from the user to set the formation of the first team. Further, for example, on the screen, the designation of any one of a plurality of tactics (for example, "left side attack", "right side attack", "central breakthrough", and "counterattack")

provided in advance may be received from the user to set the formation associated with the received tactic as the formation of the first team. Moreover, for example, on the screen, locations of respective positions set for each formation may be arbitrarily adjusted by the user.

In the following description, a region surrounded by goal lines GLa and GLb, a left sideline SL1, and a right sideline SL2 is referred to as "field". A region between a centerline CL and the goal line GLa on the own team side within the field is referred to as "own area" A1001. Meanwhile, a region between the centerline CL and the goal line GLb on the opponent team side within the field is referred to as "rival's area" A1002. A goal Ga on the own area is provided in contact with the goal line GLa, and a goal Gb on the rival's area side is provided in contact with the goal line GLb.

After the setting of the strategy for the team is completed, the user selects player characters to participate in the match from among the player characters belonging to the own team (S14). In short, the user selects player characters to be assigned to the respective positions of the formation selected in Step S12. In this step, a screen for selecting the player characters to participate in the match is displayed on the display unit 15. For example, when eighteen player characters belong to the team, the user selects eleven player characters from among the eighteen player characters on the screen.

Figure 4:
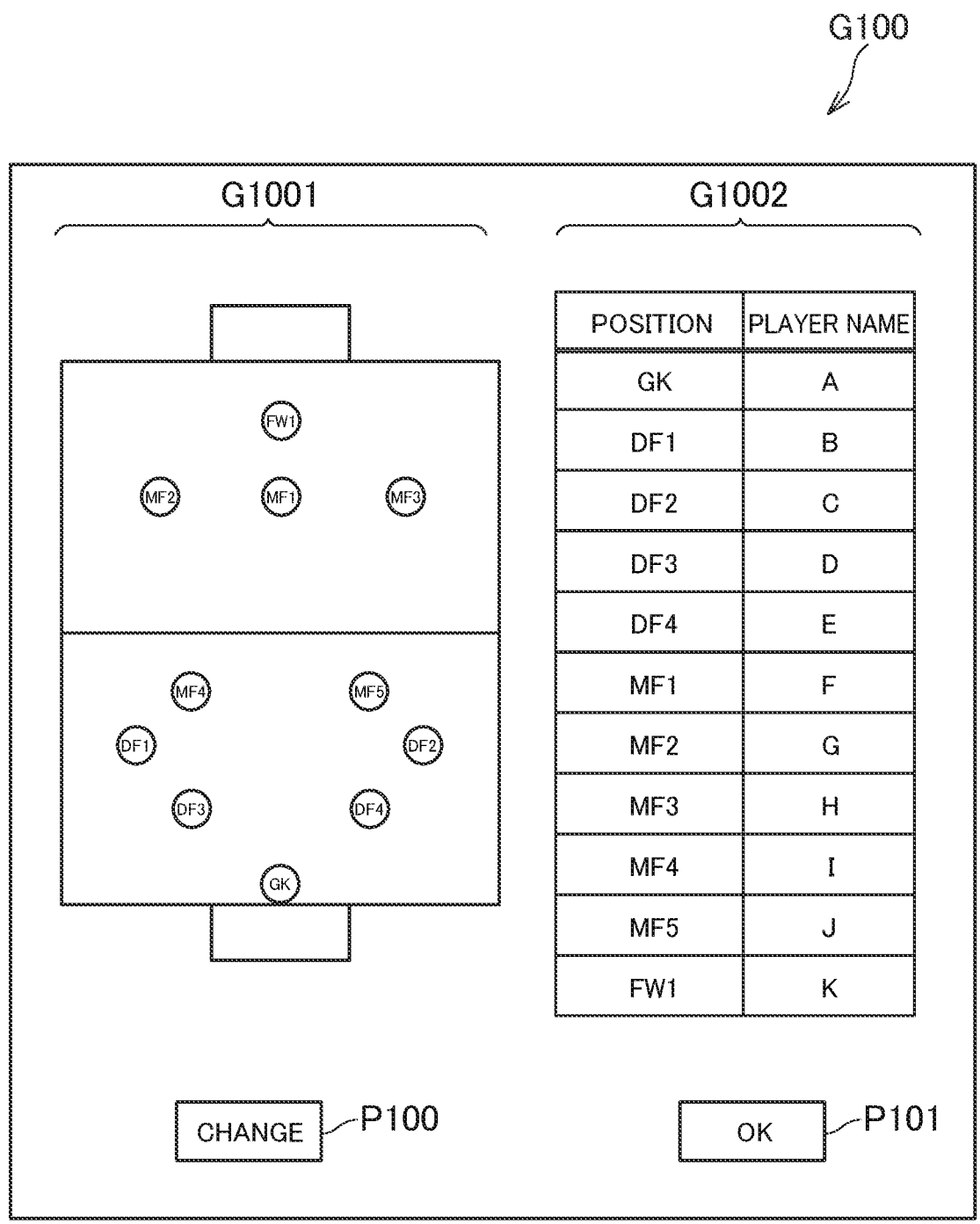
FIG. 4 is a diagram for illustrating an example of a setting display screen.

In FIG. 4, an example of a setting display screen G100 for indicating the player characters selected in Step S14 is illustrated. The setting display screen G100 illustrated in FIG. 4 includes a formation section G1001 and a participating player section G1002. In the formation section G1001, the formation selected by the user in Step S12 is displayed. In the participating player section G1002, a list of the player characters (in this case, represented by player names) selected for the respective positions by the user in Step S14 is displayed. In order to change the player characters displayed on the participating player section G1002, the user may select a change icon P100 to execute the selection of the player characters again. The user selects an OK icon P101 to determine the player characters displayed on the participating player section G1002.

Subsequently, the control unit 31 assigns each of the selected player characters of the first team to any one of a plurality of roles. For example, the plurality of roles may be set based on the number of users who operate the first team. Specifically, for example, when the number of users who operate the first team is three, three kinds of roles including attack, midfield, and defence are set. For example, when the number of users who operate the first team is two, two kinds of roles including attack and defence are set.

Further, two or more player characters are assigned to each of the above-mentioned roles. Then, the assignment of the player characters to the respective roles is conducted based on, for example, locations of the respective player characters within the formation.

Specifically, the respective player characters are ranked in ascending order of a distance from the goal line GLb of the rival's area (first criterion). Further, the player characters at the same rank in the first criterion (namely, player characters located away from the goal line GLb of the rival's area by the same distance) are ranked in ascending order of a distance from a line that is perpendicular to the centerline CL and passes through the midpoint of the centerline CL (second criterion). The player characters at the same rank in the first criterion (namely, player characters located away from the above-mentioned line by the same distance) are ranked based on such a criterion that a priority of the player character located on the right side is set higher than a priority of the player character located on the left side (namely, so that a rank of the player character located on the right side becomes higher than a rank of the player character located on the left side). Then, the respective player characters of the first team are assigned to the respective roles so that two or more player characters are assigned to each role based on the above-mentioned ranks.

For example, in the case of the formation set in FIG. 4, the ranks of the respective player characters of the first team are FW1, MF1, MF3, MF2, MF5, MF4, DF2, DF1, DF4, and DF3 in descending order of the rank.

For example, a case where the number of player characters to be assigned to the role of attack is N1 (for example, 2), the number of player characters to be assigned to the role of midfield is N2 (for example, 4), and the number of player characters to be assigned to the role of defence is N3 (for example, 4) is assumed. In this case, for example, the control unit 31 assigns the player characters ranked from first to (N1)th based on the above-mentioned criteria to the role of attack, assigns the player characters ranked from (N1+1)th to (N2)th to the role of midfield, and assigns the remaining player characters to the role of defence.

In FIG. 5, correspondence relationships between the plurality of roles and the player characters to be assigned to the roles are shown. In the example shown in FIG. 5, pieces of information (player ID, player name, and position) on the player characters to be assigned to the attack, the midfield, and the defence when the numbers N1, N2, and N3 of player characters are 2, 4, and 4, respectively, are shown. In the formation set in FIG. 4, there is only one player character having the position of "FW". Hence, in the example shown in FIG. 5, the player character having the position of "MF1", which is the second highest rank next to "FW1", is assigned to the attack in addition to the player character having the position of "FW1".

Subsequently, the respective roles of the three users U-A, U-B, and U-C who operate the first team in cooperation are set from among the attack, the midfield, and the defence (S16). For example, each user may designate a desired role. Then, any one of the plurality of roles may be set for each user based on the role designated by each user. In this case, when the roles designated by the users do not overlap, the roles designated by the users may be set as the roles of the users as they are. Meanwhile, when the roles designated by the users overlap, the designated role may be set for one user selected by lottery from among the users who have designated the same role while any one of the remaining roles that have not been designated is set for the user who has lost the lottery.

Figure 6:
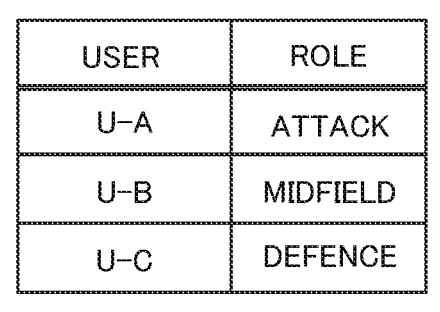

In FIG. 6, an example of setting the roles for the three users U-A, U-B, and U-C who operate the first team in cooperation is shown. In the example shown in FIG. 6, the attack is set for the user U-A, the midfield is set for the user U-B, and the defence is set for the user U-C.

Subsequently, operation subject candidates being the player characters that can be operated by the user during the match are selected for each of the three users U-A, U-B, and U-C who operate the first team in cooperation (S18). For example, two or more player characters assigned to the role set for each user are selected as the operation subject candidates. During the match, each user is allowed to operate only the player characters selected as the operation subject candidates in Step S18. That is, each user is dedicated to the operation of the player characters selected as the operation subject candidates in Step S18.

Figure 7:
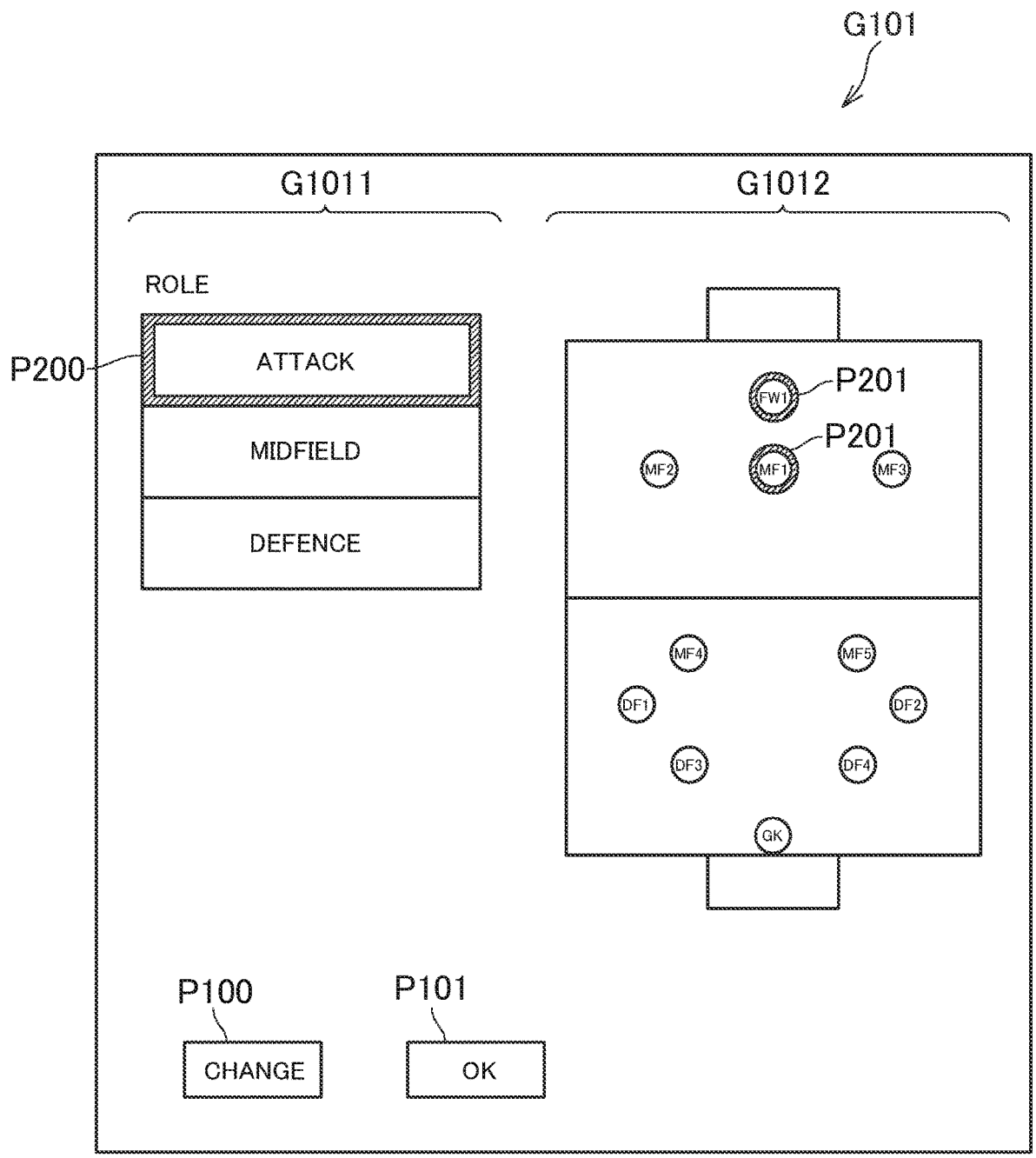
FIG. 7 is a diagram for illustrating an example of the setting display screen.

In FIG. 7, an example of a setting display screen G101 for displaying information on the operation subject candidates assigned to each role, which are selected in Step S18, is shown. The setting display screen G101 includes a role designation section G1011 and an operation subject candidate display section G1012. The role designation section G1011 is a region for designating any one of the plurality of roles. The operation subject candidate display section G1012 is a region for indicating the operation subject candidates assigned to the role designated in the role designation section G1011.

In the role designation section G1011 illustrated in FIG. 7, the plurality of roles "ATTACK", "MIDFIELD", and "DEFENCE" are displayed, and any one of the roles can be designated. An image P200 displayed in the role designation section G1011 indicates the designated role. That is, the designated role is displayed by being surrounded by the image P200, to thereby be distinguishable from the other roles that are not designated. In FIG. 7, a case where the role "ATTACK" is designated is shown, and hence the role "ATTACK" is displayed by being surrounded by the image P200 in the role designation section G1011 illustrated in FIG. 7. The image P200 is configured to move among the roles based on an operation received from the user. That is, the role displayed by being surrounded by the image P200 is changed based on the operation received from the user.

In the operation subject candidate display section G1012 illustrated in FIG. 7, the player characters assigned to the role designated in the role designation section G1011 are displayed so as to be distinguishable from the player characters that are not assigned to the designated role. For example, in the operation subject candidate display section G1012, the player characters assigned to the role designated in the role designation section G1011 are each displayed by being surrounded by an image P201, to thereby be distinguishable from the player characters that are not assigned to the designated role.

In the example illustrated in FIG. 7, the role "ATTACK" is designated in the role designation section G1011, and hence the player characters of "FW1" and "MF1" that are assigned to the role "ATTACK" are each displayed by being surrounded by the image P201 in the operation subject candidate display section G1012. For example, when the role "MIDFIELD" is designated in the role designation section G1011, the player characters each displayed by being surrounded by the image P201 in the operation subject candidate display section G1012 are changed to the player characters of "MF2", "MF3", "MF4", and "MF5" that are assigned to the role "MIDFIELD". Further, for example, when the role "DEFENCE" is designated in the role designation section G1011, the player characters each displayed by being surrounded by the image P201 in the operation subject candidate display section G1012 are changed to the player characters of "DF1", "DF2", "DF3", and "DF4" that are assigned to the role "DEFENCE". The user selects the change icon P100 to change setting contents indicated on the setting display screen G101.

When the selection of the operation subject candidates is completed, the user selects the OK icon P101. When the OK icon P101 is selected, the match is started (S20). Even after the match is started, the user is allowed to change the strategy or replace the players participating in the match. The user may also be allowed to reselect the operation subject candidates after the match is started.

Figure 8:
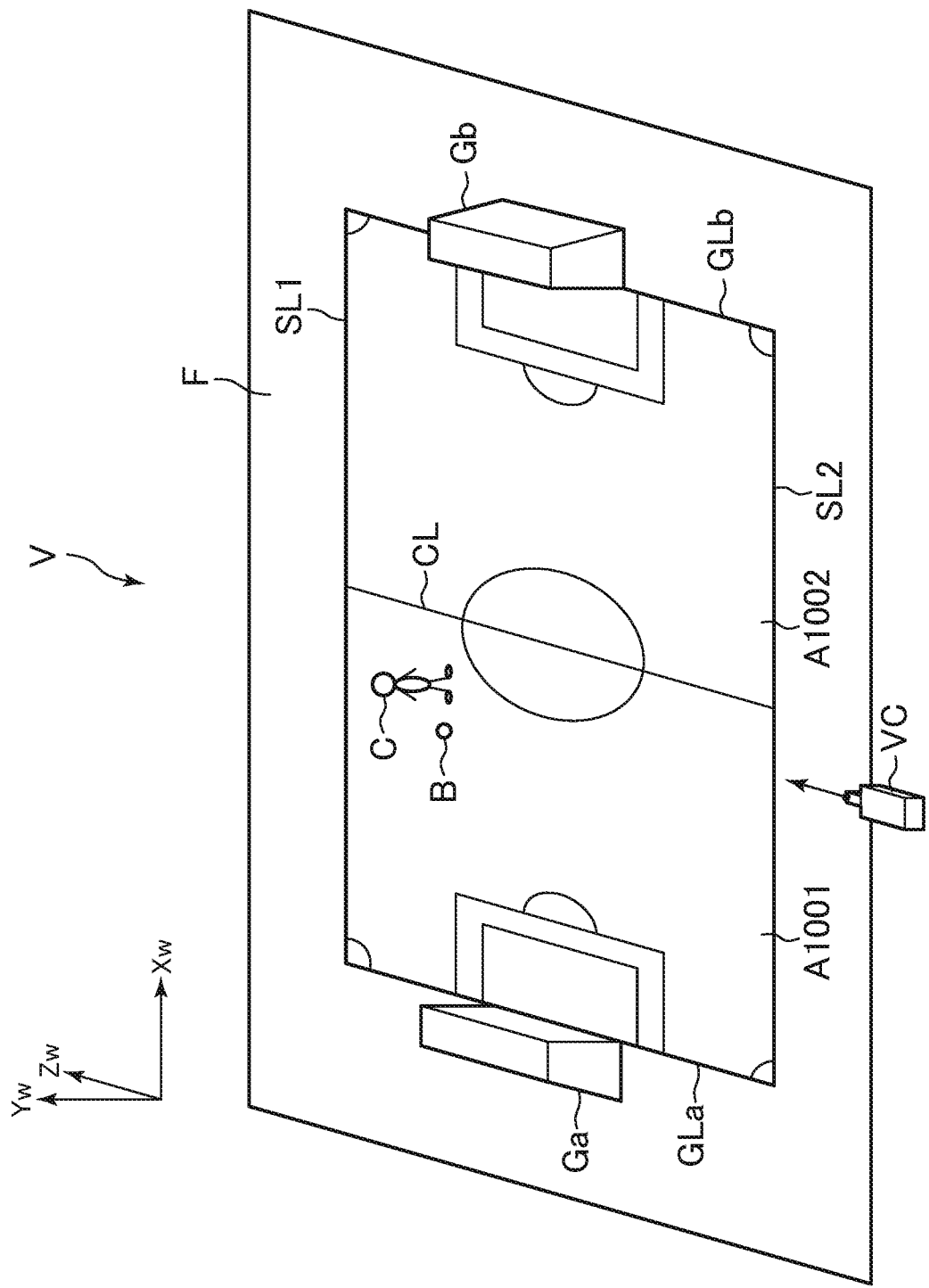
FIG. 8 is a diagram for illustrating an example of a virtual three-dimensional space.

When the match is started, a virtual three-dimensional space is built in the storage unit 32 in order to generate a game screen during the match. In FIG. 8, an example of the virtual three-dimensional space is illustrated. As illustrated in FIG. 8, a field F being an object representing a soccer field is arranged in a virtual three-dimensional space V. For example, the goal lines GLa and GLb, the left sideline SL1, the right sideline SL2, and the centerline CL are displayed on the field F. In addition, the goals Ga and Gb each being an object representing a soccer goal, player characters C each being an object representing a soccer player, and a ball B being an object representing a soccer ball are arranged on the field F.

One of the goals is associated with the first team, and the other is associated with the second team. When the ball B moves into the goal associated with any one of the teams, a scoring event of the other team occurs.

Although not shown in FIG. 8, eleven player characters C belonging to the first team and eleven player characters C belonging to the second team are arranged on the field F. For example, the eleven player characters C selected by the user from among the player characters belonging to the first team in Step S14 and the eleven player characters C selected by the computer from among the player characters belonging to the second team are arranged on the field F when the match is started.

When the player character C and the ball B become closer to each other, the player character C and the ball B are associated with each other under a predetermined condition. In this case, the ball B follows the player character C. This association is expressed as a dribbling action of the player character C. In the following description, a state in which the ball B is associated with the player character C is expressed as "the player character C is keeping the ball B".

In the state in which a given player character C is keeping the ball B, when another player character C and the ball B become closer to each other, the another player character C and the ball B are associated with each other under a predetermined condition. In this manner, the player character C snatches the ball B being kept by another player character C.

Further, a virtual camera VC (viewpoint) is set in the virtual three-dimensional space V. For example, the virtual camera VC is configured to move within the virtual three-dimensional space V based on a movement of the ball B. The game screen indicating how the virtual three-dimensional space V is viewed from the virtual camera VC is displayed on the display unit 15.

Figure 9:
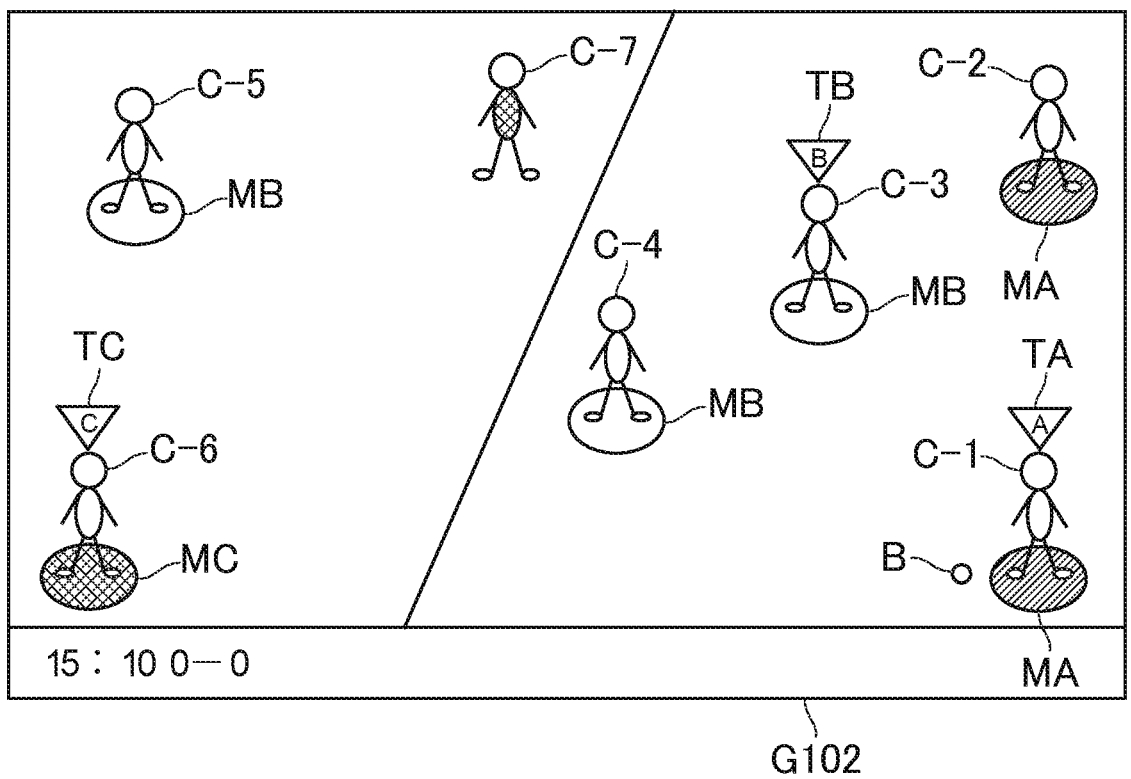
FIG. 9 is a diagram for illustrating an example of a game screen.

In FIG. 9, an example of a game screen G102 displayed during the match is illustrated. In the game screen G102 illustrated in FIG. 9, seven player characters C-1 to C-7 are displayed. Of those, the six player characters C-1 to C-6 are the player characters C belonging to the first team, and the remaining one player character C-7 is the player character C belonging to the second team.

In this case, a first mark image MA indicating the operation subject candidate of the user U-A is displayed at the feet of the player characters C-1 and C-2 among the player characters C of the first team. A second mark image MB indicating the operation subject candidates of the user U-B is displayed at the feet of the player characters C-3 to C-5. A third mark image MC indicating the operation subject candidate of the user U-C is displayed at the feet of the player character C-6. The mark image (for example, first mark image MA, second mark image MB, or third mark image MC) indicating the operation subject candidate of the user may not necessarily be displayed.

An operation subject indicating mark image TA indicating the player character C being operated by the user U-A is displayed above the head of the player character C-1. An operation subject indicating mark image TB indicating the player character C being operated by the user U-B is displayed above the head of the player character C-3. An operation subject indicating mark image TC indicating the player character C being operated by the user U-C is displayed above the head of the player character C-6.

An operation subject of each user is switched among the player characters C selected for each user as the operation subject candidate in Step S18 of FIG. 2 based on the movement of the ball or the user's switching operation. Specifically, for example, the operation subject of the user U-A is switched between the player characters C-1 and C-2 being the operation subject candidates of the user U-A based on the movement of the ball or the user's switching operation.

For example, the player character C closest to the ball B among the player characters C selected as the operation subject candidates is set as the operation subject of the user. Therefore, in the state illustrated in FIG. 9, the player character C-1 closest to the ball B among the player characters C-1 and C-2 being the operation subject candidates of the user U-A is set as the operation subject of the user U-A. When a pass from the player character C-1 to the player character C-3 is executed in the state illustrated in FIG. 9, the player character C-2 becomes closer to the player character C-3 (ball B) than the player character C-1, and hence the operation subject of the user U-A is switched from the player character C-1 to the player character C-2. In this manner, the player character C closest to the ball B among the player characters C selected as the operation subject candidates is set as the operation subject of the user.

Further, for example, when the user conducts the switching operation, the player character C that is the second closest to the ball B next to the player character C being the operation subject of the user at that point in time among the player characters C selected as the operation subject candidates is set as the operation subject of the user. For example, when the user U-B conducts the switching operation in the state illustrated in FIG. 9, the operation subject of the user U-B is switched to the player character C-4 that is the second closest to the ball B next to the player character C-3 among the player characters C-3 to C-5 being the operation subject candidates of the user U-B.

The player character C being the operation subject of the user operates based on the user's operation. For example, the player character C being the operation subject of the user is configured to move based on a direction indicating operation of the user. Further, for example, when the player character C being the operation subject of the user is keeping the ball B, the player character C conducts the pass or shot action based on a passing or shooting instruction operation of the user.

Meanwhile, the player characters C (hereinafter referred to as "own-side player characters") other than the player character C being the operation subject of the user among the player characters C belonging to the first team act based on a predetermined algorithm. For example, actions of the respective own-side player characters are controlled based on the positions (FW, MF, DF, and GK) of the own-side player characters and the tactic selected by the user in Step S12 of FIG. 2. That is, the own-side player characters are controlled to conduct the actions along their own positions based on the tactic selected by the user.

The player characters C belonging to the second team are configured to act based on a predetermined algorithm. A strategy is set for the second team as well, and the player characters C belonging to the second team are controlled to act based on the strategy. The strategy of the second team is set by the control unit 31. For example, a strategy defined in advance among a plurality of strategies is set for the second team. Further, for example, a strategy selected from among a plurality of strategies based on a random number is set for the second team.

After the match is finished, in addition to a match result screen for displaying a match result, a role evaluation result screen G103 illustrated in, for example, FIG. 10 is displayed on the display unit 15. On the role evaluation result screen G103, stats information is displayed for each role set for each of the users who operated the first team in cooperation. The stats information includes evaluation information for gameplay during the match and statistical information relating to details of the gameplay conducted during the match. In the example illustrated in FIG. 10, an evaluation point is displayed as the evaluation information, and as the statistical information, statistical information relating to various actions conducted during the match is displayed. For example, a score made during the match, the numbers of times that various actions were conducted during the match, the numbers of times that various actions were successful during the match, and the like are displayed as the statistical information. Specifically, a score, an assist, a number of shots (number of shot-on-goals), a number of passes (number of successful passes), a number of crosses, a number of fouls (number of offsides), a number of interceptions, a number of touches, a dribbling distance, and a number of tackles (number of successful tackles) are displayed as the statistical information. Of those items, the "number of shot-on-goals" represents the number of shots that caused the ball to move into a goal frame. The "number of successful passes" represents the number of times that a pass was successful (that is, number of times that a pass was received by the player character on the own side). The "number of interceptions" represents the number of times that the player character snatched the ball from the player character of the opponent team. The "number of touches" represents the number of times that the ball was touched. The "dribbling distance" represents a cumulative distance by which the player character moved while dribbling during the match. The "number of successful tackles" represents the number of times that the player character snatched the ball from the player character of the opponent team by tackling. Further, the evaluation point is calculated based on the respective values of the statistical information. For example, the evaluation point is calculated by substituting the respective values of the statistical information into a mathematical expression defined in advance.

The stats information on each role indicates the stats information on the user for which the each role is set. For example, the stats information on the attack indicates the stats information on the user U-A for which the attack is set as the role. That is, the evaluation point displayed in association with the attack indicates the evaluation point of the user U-A for which the attack is set as the role. For example, the evaluation point is determined based on whether or not the user U-A conducted gameplay in conformity with the role (attack). In other words, the evaluation point is determined based on whether or not the player character operated by the user U-A conducted the action in conformity with the role (attack). The evaluation point becomes higher when the user U-A conducted the gameplay in conformity with the role. That is, the evaluation point becomes higher when the player character operated by the user U-A conducted the action in conformity with the role (attack). Further, for example, the score, the number of shots, the number of passes, and the like and the number of crosses that are displayed in association with the attack indicate the score, the number of shots, the number of passes, and the like of the user U-A for which the attack is set as the role (that is, the score, the number of shots, the number of passes of the player character operated by the user U-A).

The stats information on each role displayed on the role evaluation result screen G103 allows each of the users who operated the first team in cooperation to grasp how well the each of the users conducted the gameplay in conformity with the role.

As described above, in this embodiment, the plurality of users who operate the first team in cooperation can play the game while switching the operation subject among a plurality of player characters being the operation subject candidates selected based on the role set for his/her own. With this configuration, each of the users who operate the first team in cooperation can play the game while concentrating on, for example, anyone of the roles of attack, midfield, and defence that is set for his/her own.

Further, in this embodiment, a plurality of characters are selected from among the characters included in the first team as the player characters corresponding to each role based on basic locations of the player characters included in the first team. Therefore, even when a formation formed without including a specific position (for example, forward) is set as the formation of the first team, a plurality of characters are selected as the characters corresponding to the role of the user. According to this embodiment, it is possible to avoid such an inconvenience that there exists no operation subject candidate of the user. Therefore, for example, even when a formation formed without including the forward being the position dedicated to the attack is set as the formation of the first team, the user who is responsible for the role dedicated to the attack can always operate characters.

3. Functions Implemented in Game System 1

Next, a description is made of components included in the game system 1 in order to implement such functions as described above. First, an outline of the game system 1 is described.

The game system 1 is a system configured to execute a game of a sport match played between the first character group operated by the users and the second character group.

The "character group" represents a group to which a plurality of characters belong. That is, the "character group" is a group formed of a plurality of characters. In other words, the character group is a group including a plurality of characters as members. In other words again, the "character group" is a group of characters aiming at a common object. For example, the "character group" is a plurality of characters associated with the same character group identification information, and the "plurality of characters belonging to a character group" represents a plurality of characters associated with character group identification information indicating the character group.

The character group can be paraphrased as a team. For example, in a case of the game of the sport match played between the first team and the second team, the plurality of characters to participate in the match among the characters belonging to the first team correspond to an example of the "first character group". Further, the plurality of characters to participate in the match among the characters belonging to the second team correspond to an example of the "second character group". In the case of the game of the sport match, the "character" is an object indicating a player, and can be set as an operation subject of the user.

Further, the "sport" represents a general competitive sport played mainly for a purpose of competing for a win-loss outcome under predetermined rules. For example, the above-mentioned "sport" is a competitive sport played for a purpose of competing for a win-loss outcome between two teams (groups). For example, the "sport" is a competitive sport played by the players belonging to the two teams by forming a formation on each side.

For example, the "sport" is a competitive sport played through use of a moving object (namely, ball game). In this case, the "moving object" represents an object configured to move when various actions are conducted by the player. For example, the "moving object" is an object configured to move when the player kicks the moving object, throws the moving object, moves while holding the moving object, or moves (dribbles) while bouncing the moving object on the ground.

Further, for example, the above-mentioned "sport" is such a competitive sport that a score is made when the moving object is caused to move into within a predetermined region. For example, soccer, basketball, ice hockey, or American football corresponds to the "competitive sport played through use of a moving object". In the case of, for example, soccer, basketball, ice hockey, or American football, the "moving object" corresponds to a ball, a puck, or the like. Further, for example, the goal of a soccer game, a basketball, or an ice hockey game or an end zone of an American football game corresponds to the "region". The moving object is an object serving as an object (target) to be snatched between two teams, and hence the moving object can be paraphrased as a target object. The "sport" is not limited to sports existing in the real world. The "sport" may be an imaginary sport.

Further, the "match" is competing for a win-loss outcome in the sport. For example, in the case of a sport played between two teams, the "match" is competing for a win-loss outcome by playing the sport between the two teams. The "match" includes a practice match played for a practice purpose. That is, the "match" also includes a match that focuses on improving the players' skills or controlling the players' condition rather than competing for a win-loss outcome. The "match" can be paraphrased as a competition, a contest, or the like.

Further, for example, the "game" is a game configured so that the first character group makes a score when the moving object is caused to move into within a first region. The "game" is also a game configured so that the second character group makes a score when the moving object is caused to move into within a second region. For example, a soccer game, a basketball game, an ice hockey game, or an American football game corresponds to an example of the "game".

For example, in the case of the soccer game, the basketball, or the ice hockey game, the "first region" represents a goal into which the first character group is to shoot the ball or the puck. In other words, the "first region" is a goal to be guarded by the second character group. In short, the "first region" is a goal for the first character group, which is arranged on the rival's area side. In the case of, for example, the American football game, the "first region" is an end zone into which the character of the first character group is to carry the ball. In other words, the "first region" is an end zone to be guarded by the second character group. In short, the "first region" is an end zone for the first character group, which exists on the rival's area side.

Further, for example, in the case of the soccer game, the basketball, or the ice hockey game, the "second region" represents a goal into which the second character group is to shoot the ball or the puck. In other words, the "second region" is a goal to be guarded by the first character group. In short, the "second region" is a goal for the first character group, which is arranged on the own area side. In the case of, for example, the American football game, the "second region" is an end zone into which the character of the second character group is to carry the ball. In other words, the "second region" is an end zone to be guarded by the first character group. In short, the "second region" is an end zone for the first character group, which exists on the own area side.

Of two regions obtained by dividing with the centerline the field (in the case of soccer, rectangular region surrounded by two touchlines and two goal lines) in which the match is played into two, the region in which the goal (end zone) to be guarded by the first character group exists is the "own area" of the first character group, and the region in which the goal (end zone) to be guarded by the second character exists is the "rival's area" of the first character group.

The "user who operates the character group" represents a user in charge of the operation of at least one character among the characters included in the character group.

The characters included in the first character group may be operated by a plurality of users. For example, a plurality of users may be in charge of the operation of different characters among the characters included in the first character group. Further, for example, each of the characters included in the first character group may be assigned to any one of the plurality of users, and each of the plurality of users may be in charge of the operation of the assigned characters.

Figure 11:
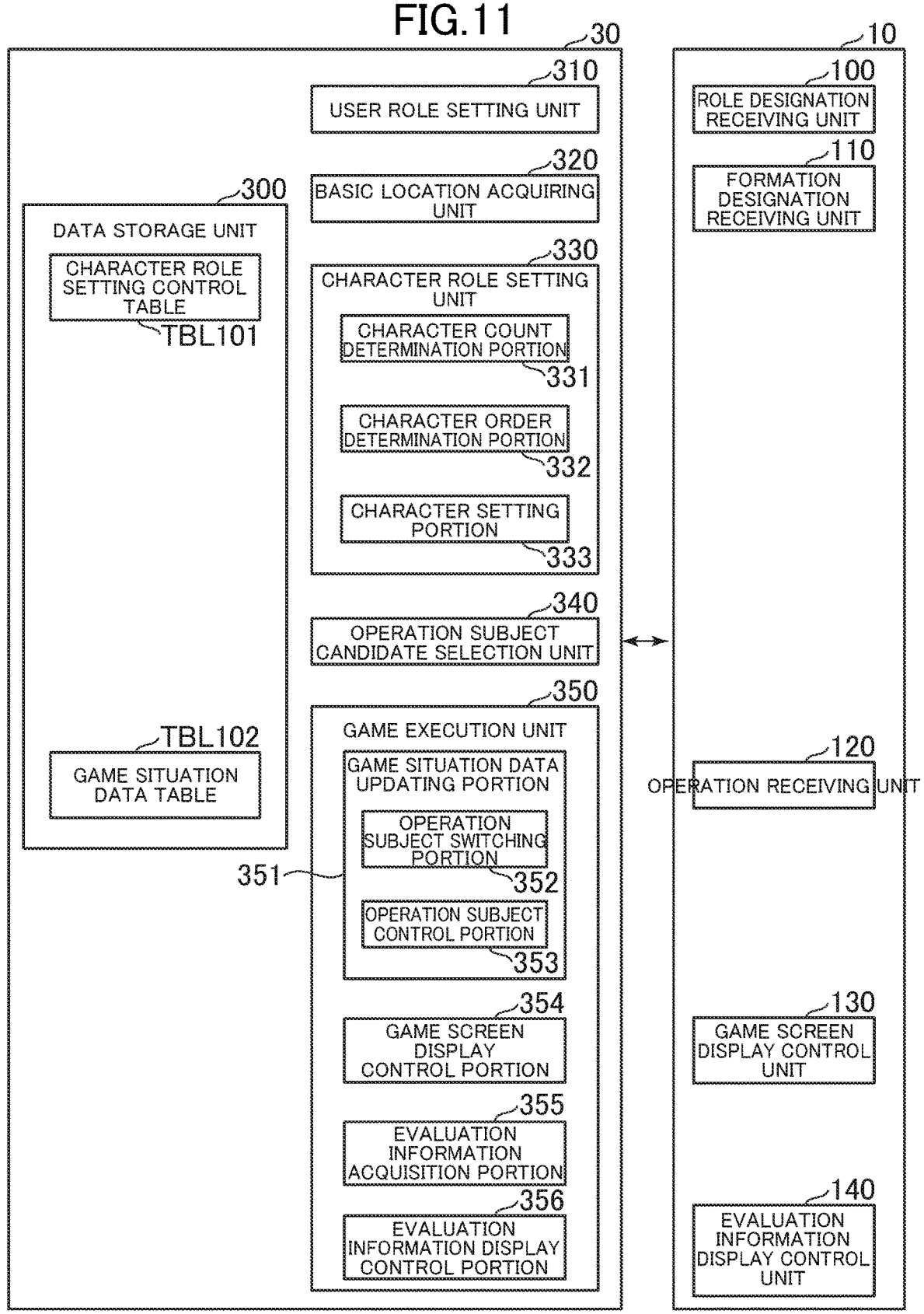
FIG. 11 is a diagram for illustrating functions provided to the game system.

Next, functions provided to the game system 1 are described based on FIG. 11. FIG. 11 is a functional block diagram for illustrating functions relating to the present invention among the functions implemented by the game system 1.

As illustrated in FIG. 11, the game device 10 includes, as functions, a role designation receiving unit 100, a formation designation receiving unit 110, an operation receiving unit 120, a game screen display control unit 130, and an evaluation information display control unit 140. The game device 10 may be configured to implement the respective functions included in the game device 10 by causing the control unit 11 of the game device 10 to execute processing based on the program stored in the storage unit 12.

As illustrated in FIG. 11, the game server 30 includes, as functions, a data storage unit 300, a user role setting unit 310, a basic location acquiring unit 320, a character role setting unit 330, an operation subject candidate selection unit 340, and a game execution unit 350. The game server 30 may be configured to implement the respective functions included in the game server 30 by causing the control unit 31 of the game server 30 to execute processing based on the program stored in the storage unit 32.

[3.1. Data Storage Unit 300]

The data storage unit 300 is implemented mainly by, for example, the storage unit 32 of the game server 30. The data storage unit 300 may be implemented by a storage unit included in another device capable of conducting data communications to/from the game server 30. The data storage unit 300 is configured to store various kinds of data necessary for the game executed in the game system 1. The following description is made by taking as an example a case where the "game" executed in the game system 1 is a soccer game imitating a soccer match played between the first team and the second team. The first team is operated by the plurality of users U-A, U-B, and U-C.

The following description is made of a character role setting control table TBL101 and a game situation data table TBL102 that are examples of data stored in the data storage unit 300.

[3.1.1. Character Role Setting Control Table TBL101]

The character role setting control table TBL101 is a data table that defines a relationship among the number of users who operate the first team, the formation of the first team, and the player characters to be assigned to each role.

In FIG. 12, an example of the character role setting control table TBL101 is shown. As shown in FIG. 12, the character role setting control table TBL101 stores a correspondence relationship between the "role" and a combination of the "number of users" and the "formation". The "number of users" indicates the number of uses who operate the first team. The "formation" indicates the formation of the first team. For example, the "formation" indicates the numbers of forwards (FWs), midfielders (MFs), and defenders (DFs) that form the formation of the first team. The "role" indicates how the roles are to be assigned to the respective player characters included in the first team.

In FIG. 12, the numerals "1" to "10" within a "role" column represent the ranks of the player characters. Although described later in detail, the ranks of the player characters are determined based on the basic locations of the player characters. The letters "A", "M", and "D" within the "role" column represent the roles of attack, midfield, and defence.

For example, the example shown in FIG. 12 indicates that, when the number of users who operate the first team is three and the numbers of forwards (FWs), midfielders (MFs), and defenders (DFs) that form the formation of the first team are one, five, and four, respectively, the role of attack is assigned to the player characters having the first and second ranks, the role of midfield is assigned to the player characters having the third to sixth ranks, and the role of defence is assigned to the player characters having the seventh to tenth ranks.

The number of kinds of roles is changed based on the number of users who operate the first team. When the number of users who operate the first team is, for example, three, there are three kinds of roles including attack, midfield, and defence. When the number of users who operate the first team is, for example, two, there are two kinds of roles including attack and defence. For example, the example shown in FIG. 12 indicates that, when the number of users who operate the first team is two and the numbers of forwards (FWs), midfielders (MFs), and defenders (DFs) that form the formation of the first team are one, five, and four, respectively, the role of attack is assigned to the player characters having the first to fifth ranks, and the role of defence is assigned to the player characters having the sixth to tenth ranks.

[3.1.2. Game Situation Data Table TBL102]

Further, the data storage unit 300 further stores the game situation data table TBL102 for managing game situation data indicating the current situation of the soccer game. In FIG. 13, an example of the game situation data table TBL102 is shown. The game situation data shown in FIG. 13 includes the columns of a "player ID", a "participation flag", a "position", an "operation subject candidate flag", an "operation subject flag", and a "ball keeping flag".

The "player ID" represents information for uniquely identifying the player character. In FIG. 13, the player characters having the player IDs of from "P101" to "P118"

are the player characters belonging to the first team, and the player characters having the player IDs of from "P201" to "P218" are the player characters belonging to the second team.

The "participation flag" takes the values "0", "1", and "2". The value "0" indicates that the player character has not participated in the match yet. The value "1" indicates that the player character is participating in the match. The value "2" indicates that the player character participated in the match and is not currently participating in the match after being replaced by another player character.

The "operation subject candidate flag" indicates whether or not the player character is selected as the operation subject candidate, and takes the values "0" and "1". The value "0" indicates that the player character is not the operation subject candidate, and the value "1" indicates that the player character is the operation subject candidate. The "operation subject candidate flag" may be provided to, for example, each of the plurality of users who operate the first team.

The "operation subject flag" indicates whether or not the player character is set as the operation subject of the user, and takes the values "0" and "1". The value "0" indicates that the player character is not currently set as the operation subject of the user, and the value "1" indicates that the player character is currently set as the operation subject of the user. The "operation subject flag" may be provided to, for example, each of the plurality of users who operate the first team.

The "ball keeping flag" indicates whether or not the player character is keeping the ball, and takes the values "0" and "1". The value "0" indicates that the player character is not currently keeping the ball, and the value "1" indicates that the player character is currently keeping the ball.

Although not shown in FIG. 13, in addition to the above-mentioned information, the game situation data also includes, for example, data indicating current states (for example, location and posture) of the player character arranged in the virtual three-dimensional space V. The data storage unit 300 further stores, for example, data indicating current states (for example, location, moving direction, and moving speed) of the ball and data indicating current states (for example, location, and line-of-sight direction) of the virtual camera VC. The data storage unit 300 also stores, for example, data indicating the scores of the two teams and data indicating an elapsed time.

[3.2. Role Designation Receiving Unit 100]

The role designation receiving unit 100 is implemented mainly by, for example, the control unit 11, the storage unit 12, the communication unit 13, and the input unit 14 of the game device 10.

The role designation receiving unit 100 is configured to receive the designation of any one of the plurality of roles as the role to be played by the user in the soccer game (soccer match). The "role" represents a role to be played by the user in the match. In other words, the "role" indicates an action to be carried out by the user in the match. In other words again, the "role" indicates an action to be required (expected) for the user in the match. In the case of, for example, the soccer game, the "role" corresponds to the attack, the midfield, and the defence. The attack is a role dedicated to the attack. The defence is a role dedicated to the defence. The midfield is a role for conducting both the attack and the defence. Further, the role of the user may be set to a role indicated by role information stored in association with identification information on the user.

For example, the role designation receiving unit 100 may be configured to transmit information on the role, which is designated from among the plurality of roles by the user through the input unit 14, to the game server 30 by the communication unit 13. The number of roles for the plurality of roles may be set to equal to or larger than the number of users who operate the first character group.

[3.3. User Role Setting Unit 310]

The user role setting unit 310 is implemented mainly by, for example, the control unit 31, the storage unit 32, and the communication unit 33 of the game server 30.

The user role setting unit 310 sets anyone of the plurality of roles as the role to be played by the user in the soccer game (example of the sport game).

For example, when the player characters (example of the characters) included in the first team (example of the first character group) are operated by the plurality of users, the user role setting unit 310 sets any one of the plurality of roles for each of the plurality of users as the role to be played by the user in the match.

For example, the user role setting unit 310 is configured to set the role selected by the user from among the plurality of roles as the role of the user. For example, the user role setting unit 310 sets the role of the user based on the information on the role received from each of the plurality of users who operate the first team by the role designation receiving unit 100. When the roles designated by each of the plurality of users who operate the first team do not overlap, the user role setting unit 310 may set the roles designated by the respective users as the roles of the respective users as they are. On the other hand, when at least a part of the roles designated by each of the plurality of users who operate the first team overlaps, the user role setting unit 310 may set the designated role for one user selected by lottery from among the users who have designated the same role, and may set any one of the remaining roles that have not been designated for the user who has lost the lottery.

For example, the user role setting unit 310 may be configured to set the role selected by the computer from among the plurality of roles as the role of the user.

[3.4. Formation Designation Receiving Unit 110]

The formation designation receiving unit 110 is implemented mainly by, for example, the control unit 11, the storage unit 12, the communication unit 13, and the input unit 14 of the game device 10.

The formation designation receiving unit 110 is configured to receive the designation of the formation of the first team. The "formation" represents a formation (basic arrangement) of the plurality of player characters included in a team. In the case of, for example, the soccer game, the formation called "4-5-1", "4-4-2", "3-5-2", or the like corresponds to an example of the "formation".

For example, the formation designation receiving unit 110 receives a formation selected by the user from among the plurality of formations as the formation of the first team.

The formation designation receiving unit 110 may be further configured to, for example, receive a formation created by the user as the formation of the first team. That is, the formation designation receiving unit 110 may be configured to receive a formation having the locations of the respective positions adjusted by the user as the formation of the first team.

The formation designation receiving unit 110 may be further configured to, for example, receive the designation of the tactic for the first team, and to handle a formation associated with the tactic as the formation of the first team.

For example, the formation designation receiving unit 110 may be configured to receive the designation of the formation of the first team only from a representative one of the plurality of users who operate the first team in cooperation.

The formation designation receiving unit 110 may be further configured to, for example, transmit data indicating the formation of the first team designated by the user to the game server 30 by the communication unit 13. The data includes, for example, data indicating a kind of formation designated by the user or data indicating locations of the respective player characters (respective positions) within the formation.

[3.5. Basic Location Acquiring Unit 320]

The basic location acquiring unit 320 is implemented mainly by, for example, the control unit and the storage unit of the game server 30.

The basic location acquiring unit 320 is configured to acquire the basic locations of the player characters included in the first team based on formation data on the first team.

The "formation data" represents data indicating a formation. Further, the "formation data" represents, for example, data indicating the kind of formation or the locations of the respective player characters (respective positions) within the formation.

The "basic location" represents the basic location of the player character set during the match. That is, the "basic location" is a location being a basis of the action conducted by the player character during the match. The player character conducts the action within a range corresponding to the basic location during the match. Thus, in other words, the "basic location" indicates a range of the action conducted by the player character during the match. Further, for example, the "basic location" is the location of the player character within the formation. Further, for example, the "basic location" is the location of the player character set when the match is started. In the case of, for example, the soccer game, the "basic location" can also be expressed as a location of the player character on the field set at a time of a kickoff.

For example, the basic location acquiring unit 320 may identify the formation of the first team based on the data transmitted from the formation designation receiving unit 110 to the game server 30, and may acquire the basic locations of the player characters included in the first team.

[3.6. Character Role Setting Unit 330]

The character role setting unit 330 is implemented mainly by, for example, the control unit 31 and the storage unit 32 of the game server 30.

The character role setting unit 330 is configured to set a plurality of player characters from among the player characters included in the first team as the player characters corresponding to each of the plurality of roles based on the basic locations of the player characters included in the first team, which are acquired by the basic location acquiring unit 320. The "player characters corresponding to each of the plurality of roles" represents the player characters that are suitable for playing each of the plurality of roles.

For example, in the case of the soccer game illustrated in FIG. 8 or other such game configured so that the first team makes a score when the ball B (example of the moving object) is caused to move into within the goal Gb (example of the first region), the character role setting unit 330 may be configured to set the player characters corresponding to each of the plurality of roles based on distances between the goal Gb and the basic locations of the player characters included in the first team. For example, the character role setting unit 330 may be configured to determine order information on the player characters included in the first team based on the distances between the basic locations of the player characters included in the first team and the goal Gb, and to assign the player characters included in the first team to the plurality of roles based on the determined order information.

The character role setting unit 330 includes a character count determination portion 331, a character order determination portion 332, and a character setting portion 333, and the above-mentioned functions may be implemented by processing executed by respective components. The functions included in the character role setting unit 330 are described below in detail.

[3.6.1. Character Count Determination Portion 331]

The character count determination portion 331 is configured to determine the number of player characters to be selected as the player characters corresponding to each of the plurality of roles based on formation data on the first team and the number of users who operate the first team.

For example, the character count determination portion 331 may determine the number of player characters corresponding to each of the plurality of roles based on the formation data on the first team, the number of users who operate the first team, and the character role setting control table TBL101 stored in the data storage unit 300.

Specifically, the character count determination portion 331 may refer to the "role" column of the character role setting control table TBL101 with the formation data on the first team (numbers of FWs, MFs, and DFs) and the number of users who operate the first team as keys to determine the number of player characters corresponding to each of the plurality of roles. More specifically, the number of the attacks (A), the number of midfielders (M), and the number of the defence (D), which are included in the "role" column identified by the formation data on the first team and the number of users who operate the first team, may be set as the numbers of player characters corresponding to the respective roles.

[3.6.2. Character Order Determination Portion 332]

The character order determination portion 332 is configured to set the order information on the player characters included in the first team based on the distances between the goal Gb (example of the first region) and the basic locations of the player characters included in the first team.

Figure 14:
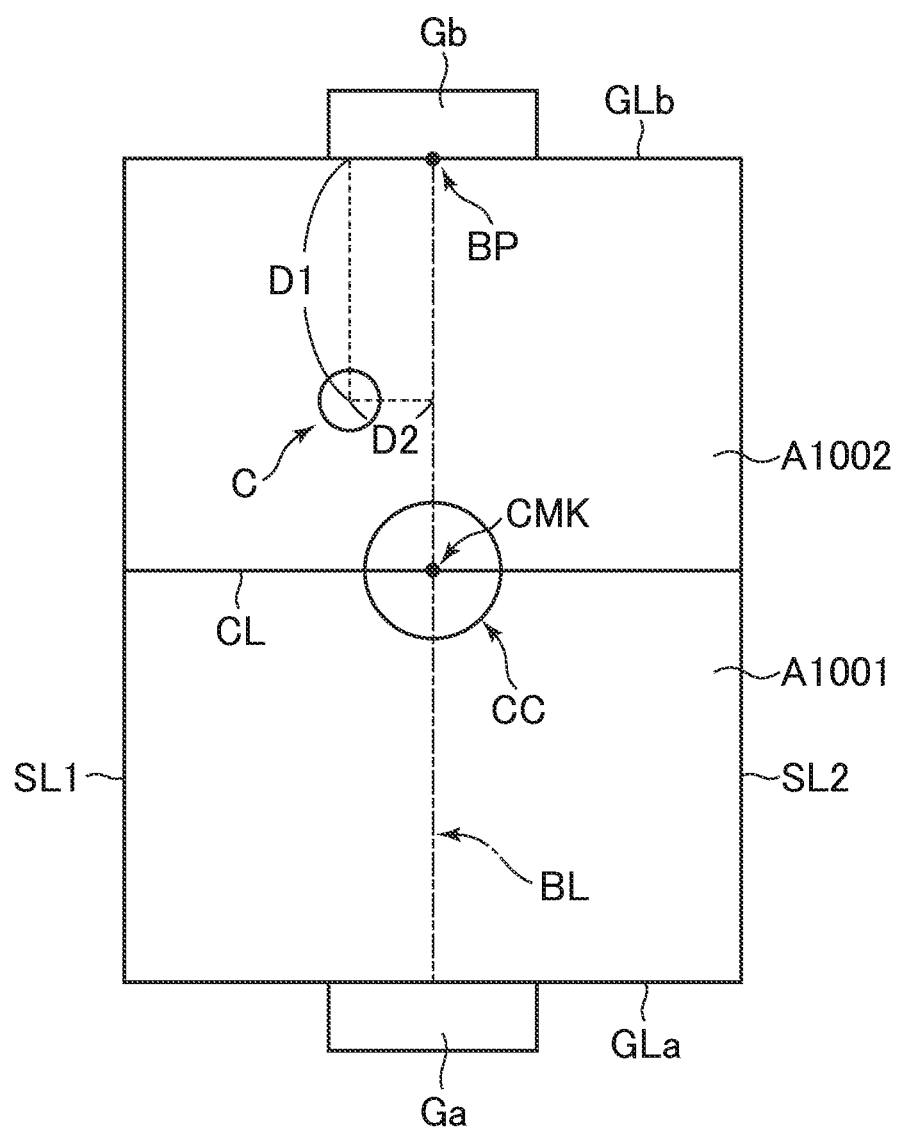
FIG. 14 is a diagram for illustrating an example of a reference for determining an order of characters.

Now, with reference to FIG. 14, a description is made of an example of a method of determining the order information on the player characters conducted by the character order determination portion 332.

FIG. 14 is an illustration of a state in which the player character C included in the first team is arranged in the basic location on the field. As illustrated in FIG. 14, the centerline CL is drawn as a boundary between the own area A1001 and the rival's area A1002, and a center circle CC is provided with a center mark CMK being the middle point of the centerline CL as the center. In FIG. 14, a line BL (example of a first reference line) is a line passing through the center mark CMK so as to be perpendicular to the centerline CL. The line BL is a line connecting between the goal Gb (example of the first region) of the rival's area A1002 and the goal Ga (example of the second region) of the own area A1001. In FIG. 14, a reference point BP is an intersection point between the line BL and the goal line GLb (example of a second reference line) on the rival's area A1002 side.

In this case, a distance D1 illustrated in FIG. 14 corresponds to a distance between the goal line GLb of the rival's area A1002 and the basic location of the player character C. The distance D1 corresponds to a distance between the goal Gb of the rival's area A1002 and the basic location of the player character C in the line BL direction (touchline direction). A distance D2 illustrated in FIG. 14 corresponds to a distance between the line BL and the basic location of the player character C. The distance D1 corresponds to a distance between the goal Gb of the rival's area A1002 and the basic location of the player character C in a direction (goal line direction) perpendicular to the line BL.

First, the character order determination portion 332 sorts the respective player characters included in the first team in ascending order of the distance D1 (first criterion). That is, the character order determination portion 332 sets the order rank of the player character having the shorter distance D1 higher than the order rank of the player character having the longer distance D1.

When there exist a plurality of player characters that have the same distance D1, the character order determination portion 332 sorts the plurality of player characters having the distance D1 in ascending order of the distance D2 (second criterion). That is, when there exist a plurality of player characters that have the same distance D1, the character order determination portion 332 sets the order rank of the player character having the shorter distance D2 among the plurality of player characters higher than the order rank of the player character having the longer distance D2.

When there exist a plurality of player characters that have both the same distance D1 and the same distance D2, the character order determination portion 332 sets the order rank of the player character located on one side (for example, on the right side) of the line BL higher than the order rank of the player character located on the other side (for example, on the left side) of the line BL.

In this case, the order information on the respective player characters set based on the above-mentioned criteria when the formation of the first team exhibits the formation illustrated in FIG. 3 and FIG. 4 is shown in FIG. 15. In FIG. 15, a correspondence relationship among the order rank, identification information (player ID) on the player character included in the first team corresponding to the order rank, the player name, and the position is shown.

[3.6.3. Character Setting Portion 333]

The character setting portion 333 is configured to set the player characters corresponding to each of the plurality of roles from among the player characters included in the first team based on a result of the determination conducted by the character count determination portion 331 and the order information determined by the character order determination portion 332.

For example, the character setting portion 333 sets the player characters corresponding to each of the plurality of roles from among the player characters included in the first team based on the order information determined by the character order determination portion 332 and the character role setting control table TBL101 shown in FIG. 12. That is, the character setting portion 333 selects player characters, the number of which corresponds to the number of player characters determined by the character count determination portion 331 as the player characters corresponding to each of the plurality of roles, in order from among the player characters included in the first team based on the order information determined by the character order determination portion 332. When there are, for example, three kinds of roles including attack, midfield, and defence, the character setting portion 333 assigns player characters to the roles of attack, midfield, and defence in the stated order and in descending order of the order rank. When there are, for example, two kinds of roles including attack and defence, the character setting portion 333 assigns player characters to the roles of attack and defence in the stated order and in descending order of the order rank.

Figure 16:
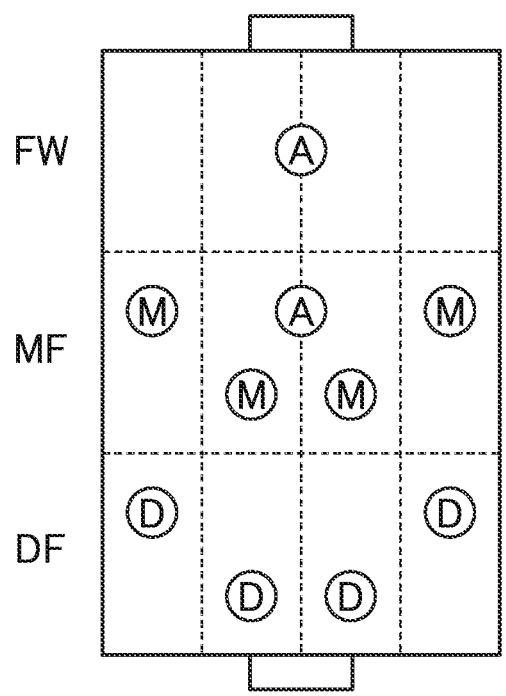
FIG. 16 is a diagram for illustrating an example of the characters set for the roles.

For example, when the number of users who operate the first team is three and the numbers of forwards (FWs), midfielders (MFs), and defenders (DFs) that form the formation of the first team are one, five, and four, respectively, the number of player characters to be assigned to the role of attack is two as shown in FIG. 12, and as illustrated in FIG. 16, the player characters having the order ranks determined to be the first and the second by the character order determination portion 332 are set as the player characters corresponding to the role of attack. In FIG. 16, "A" indicates the player character for which the role of attack is set.

Further, the number of player characters to be assigned to the role of midfield is four as shown in FIG. 12, and the player characters having the order ranks determined to be the third to the sixth by the character order determination portion 332 are set as the player characters corresponding to the role of midfield. In FIG. 16, "M" indicates the player character for which the role of midfield is set.

In addition, the number of player characters to be assigned to the role of defence is four as shown in FIG. 12, and the player characters having the order ranks determined to be the seventh to the tenth by the character order determination portion 332 are set as the player characters corresponding to the role of defence. In FIG. 16, "D" indicates the player character for which the role of defence is set.

As described above, the character role setting unit 330 is configured to assign the roles of attack, midfield, and defence to the player characters in ascending order of the distance from the goal Gb of the rival's area A1002.

The character role setting unit 330 may be configured to assign the roles of attack, midfield, and defence to the player characters in ascending order of a distance from the goal Ga of the own area A1001.

For example, in the case of the soccer game illustrated in FIG. 8 or other such game configured so that the second team makes a score when the ball B (example of the moving object) is caused to move into within the goal Ga (example of the second region), the character role setting unit 330 may be configured to set the player characters corresponding to each of the plurality of roles based on the distances between the goal Ga and the basic locations of the player characters included in the first team. For example, the character role setting unit 330 may be configured to determine the order information on the player characters included in the first team based on the distances between the basic locations of the player characters included in the first team and the goal Ga, and to assign the player characters included in the first team to the plurality of roles based on the determined order information.

That is, the character order determination portion 332 first sorts the respective player characters included in the first team in ascending order of a distance (hereinafter referred to as "distance D3") between the goal line GLa of the own area A1001 and the basic location of the player character C (first criterion). That is, the character order determination portion 332 sets the order rank of the player character having the shorter distance D3 higher than the order rank of the player character having the longer distance D3.

When there exist a plurality of player characters that have the same distance D3, the character order determination portion 332 sorts the plurality of player characters having the distance D3 in ascending order of the distance D2 (second criterion). That is, when there exist a plurality of player characters that have the same distance D3, the character order determination portion 332 sets the order rank of the player character having the shorter distance D2 among the plurality of player characters higher than the order rank of the player character having the longer distance D2.

When there exist a plurality of player characters that have both the same distance D3 and the same distance D2, the character order determination portion 332 sets the order rank of the player character located on one side (for example, on the right side) of the line BL higher than the order rank of the player character located on the other side (for example, on the left side) of the line BL.

Then, the character setting portion 333 sets the player characters corresponding to each of the plurality of roles from among the player characters included in the first team based on the order information determined by the character order determination portion 332. When there are, for example, three kinds of roles including attack, midfield, and defence, the character setting portion 333 assigns player characters to the roles of attack, midfield, and defence in the stated order and in descending order of the order rank. When there are, for example, two kinds of roles including attack and defence, the character setting portion 333 assigns player characters to the roles of attack and defence in the stated order and in descending order of the order rank.

[3.7. Operation Subject Candidate Selection Unit 340]

The operation subject candidate selection unit 340 is implemented mainly by, for example, the control unit 31 and the storage unit 32 of the game server 30.

The operation subject candidate selection unit 340 is configured to select a plurality of operation subject candidates from among the player characters included in the first team based on a setting content of the user role setting unit 310 and a setting content of the character role setting unit 330. For example, the operation subject candidate selection unit 340 selects the plurality of player characters set by the character role setting unit 330 for the role set for the user by the user role setting unit 310 as the operation subject candidates of the user.

The "operation subject candidate" represents a candidate for the operation subject of the user. That is, the operation subject candidate is a player character that can be selected as the operation subject of the user. In other words, the "operation subject candidate" is a player character that can be selected as a destination to which the operation subject of the user is to be switched. When the operation subject of the user is switched, a switching destination is selected from among the player characters being the operation subject candidates, and the operation subject of the user is switched to the player character selected as the switching destination. That is, the player character selected as the switching destination is set as a new operation subject.

Further, for example, when the first team is operated by a plurality of users, the operation subject candidate selection unit 340 selects a plurality of operation subject candidates from among the player characters included in the first team for each of the plurality of users. For example, the operation subject candidate selection unit 340 selects the plurality of operation subject candidates set by the character role setting unit 330 for the role, which is set for each of the plurality of users by the user role setting unit 310, as the operation subject candidate of each of the users.

For example, the operation subject candidate selection unit 340 sets the player characters assigned to the role of attack as the operation subject candidates of the user U-A for which the role of attack is set. In the same manner, the operation subject candidate selection unit 340 sets the player characters assigned to the role of midfield as the operation subject candidates of the user U-B for which the role of midfield is set, and sets the player characters assigned to the role of defence as the operation subject candidates of the user U-C for which the role of defence is set.

[3.8. Operation Receiving Unit 120]

The operation receiving unit 120 is implemented mainly by, for example, the control unit 11, the storage unit 12, the communication unit 13, and the input unit 14 of the game device 10.

The operation receiving unit 120 is configured to receive the user's operation. The operation receiving unit 120 may be configured to, for example, receive the user's operation through an input unit. The operation receiving unit 120 may be further configured to, for example, transmit the operation information on the game, which has been received from the user through the input unit, to the game server 30 through a communication unit. For example, the operation information on the game may include information indicating that an operation for switching the character being the operation subject among the characters being the plurality of operation subject candidates selected for the user by the operation subject candidate selection unit 340, an operation causing the character being the operation subject to conduct an action (movement, pass, shot, dribble, or the like), or other such operation has been conducted.

[3.9. Game Execution Unit 350]

The game execution unit 350 is implemented mainly by, for example, the control unit 31, the storage unit 32, and the communication unit 33 of the game server 30.

The game execution unit 350 is configured to execute the soccer game (example of the game) based on, for example, data and a program stored in the data storage unit 300 and the operation information on the user received from the operation receiving unit 120. The game execution unit 350 includes, for example, a game situation data updating portion 351, a game screen display control portion 354, an evaluation information acquisition portion 355, and an evaluation information display control portion 356. The respective functions included in the game execution unit 350 are described below in detail.

[3.9.1. Game Situation Data Updating Portion 351]

The game situation data updating portion 351 is configured to update the game situation data indicating a game situation based on the operation information on the user received from the operation receiving unit 120. For example, the game situation data updating portion 351 may be configured to update a data content of the game situation data table TBL102 stored in the data storage unit 300 based on the operation information on the user received from the operation receiving unit 120.

The game situation data updating portion 351 may be further configured to update, for example, data indicating the locations, the postures, or the like of the player characters arranged in the virtual three-dimensional space V. The game situation data updating portion 351 may be further configured to update, for example, data indicating the location, the moving direction, and the moving speed of the ball and data indicating the location and the line-of-sight direction of the virtual camera VC. The game situation data updating portion 351 may be further configured to update, for example, data indicating the score of the two teams and data indicating the elapsed time.

The game situation data updating portion 351 may include an operation subject switching portion 352 and an operation subject control portion 353, and may be configured to update the game situation data. The respective functions included in the game situation data updating portion 351 are described below in detail.

[3.9.1.1. Operation Subject Switching Portion 352]

The operation subject switching portion 352 is configured to switch the operation subject of the user among the characters selected as the plurality of operation subject candidates during the soccer game (soccer match).

The "operation subject" represents a player character being a target of the user's operation set during the match. In other words, the "operation subject" is a player character being operated by the user. In short, the "operation subject" is a player character being operated based on the user's operation.

For example, the operation subject switching portion 352 switches the operation subject of the user among the operation subject candidates selected by the operation subject candidate selection unit 340 for the user who operates the first team. The operation subject switching portion 352 may be further configured to, for example, switch the operation subject of the user among the plurality of operation subject candidates selected by the operation subject candidate selection unit 340 for the user based on the operation information on the user received from the operation receiving unit 120. The operation subject switching portion 352 may be further configured to, for example, switch the operation subject of the user among the plurality of operation subject candidates selected by the operation subject candidate selection unit 340 for the user based on the game situation data (for example, positional relationship between player character being the operation subject candidate of the user and the ball).

The operation subject switching portion 352 may be further configured to, for example, update the operation subject flag of the user stored for the player character of a switching source to "0" and the operation subject flag of the user stored for the player character of a switching destination to "1" in the game situation data table TBL102 when switching the player character being the operation subject of the user.

[3.9.1.2. Operation Subject Control Portion 353]

The operation subject control portion 353 causes the player character being the operation subject of the user to act based on the user's operation during the soccer game (soccer match).

For example, the operation subject control portion 353 may be configured to control the action of the player character being the operation subject of the user based on the operation information on the user received from the operation receiving unit 120. The operation subject control portion 353 may be further configured to, for example, control the action (movement, pass, shot, dribble, or the like) of the player character, for which the operation subject flag of the user is "1" in the game situation data table TBL102, based on the operation information on the user received from the operation receiving unit 120.

[3.9.2. Game Screen Display Control Portion 354 and Game Screen Display Control Unit 130]

The game screen display control portion 354 is implemented mainly by, for example, the control unit 31, the storage unit 32, and the communication unit 33 of the game server 30.

The game screen display control portion 354 is configured to execute control for displaying, for example, the game screen for displaying the situation of the soccer game (soccer match) on the display unit 15 of the game device 10.

For example, the game screen display control portion 354 transmits data required for displaying the game screen during the soccer game (soccer match) to the game device 10 by the communication unit 33, to thereby display the game screen on the display unit 15 of the game device 10.

For example, the game screen display control portion 354 transmits the game situation data updated by the game situation data updating portion 351 to the game device 10 during the soccer game (soccer match), to thereby display the game screen on the display unit 15 of the game device 10.

The game screen display control portion 354 generates the game screen for illustrating how the player characters and the ball that are arranged in the virtual three-dimensional space V are viewed from the location and the line-of-sight direction of the virtual camera VC during the soccer game (soccer match), and executes the control for displaying the game screen on a display unit of the game device 10. The game screen display control portion 354 may be configured to, for example, sequentially generate data on the game screen at a predetermined time interval, and to sequentially transmit the generated data on the game screen to the game device 10 by the communication unit 33.

The game screen display control unit 130 is implemented mainly by, for example, the control unit 11, the storage unit 12, and the communication unit 13 of the game device 10.

The game screen display control unit 130 is configured to execute control for displaying, for example, the game screen for displaying the situation of the soccer game (soccer match) on the display unit 15 of the game device 10.

The game screen display control unit 130 may be configured to, for example, receive the data transmitted from the game screen display control portion 354 of the game server 30 by the communication unit 13, and to display the game screen on the display unit 15 based on the received data.

[3.9.3. Evaluation Information Acquisition Portion 355]

The evaluation information acquisition portion 355 is configured to acquire the evaluation information relating to the role of the user achieved in the match based on the evaluation information on the characters corresponding to the role achieved in the match when the soccer game (soccer match) is finished.

The "evaluation information relating to the role" represents information indicating whether or not the role was played during the match or information indicating how much the role was played during the match. For example, the "evaluation information relating to the role" is information indicating whether or not the plurality of player characters selected as the player characters corresponding to the role conducted the actions in conformity with the role. In other words, the "evaluation information relating to the role" is information indicating how much the plurality of player characters selected as the player characters corresponding to the role conducted the action in conformity with the role. For example, the "evaluation information relating to the role" is acquired by executing statistical processing based on the evaluation information on the plurality of player characters selected as the player characters corresponding to the role. For example, an average of the evaluation information on the plurality of player characters selected as the player characters corresponding to the role corresponds to an example of the "evaluation information relating to the role".

Further, the "evaluation information on the player character achieved in the match" represents information indicating a result of evaluating the action conducted by the player character during the match. For example, information indicating the number of times that the player character conducted a predetermined action (for example, pass action, shot action, or tackle action) during the match or the number of times that the character succeeded in the predetermined action (for example, pass action, shot action, or tackle action) during the match corresponds to an example of the "evaluation information on the player character achieved in the match".

[3.9.4. Evaluation Information Display Control Portion 356 and Evaluation Information Display Control Unit 140]

The evaluation information display control portion 356 is implemented mainly by, for example, the control unit 31, the storage unit 32, and the communication unit 33 of the game server 30.

The evaluation information display control portion 356 is configured to execute control for displaying the evaluation information relating to the role of the user on the display unit 15.

For example, the evaluation information display control portion 356 is configured to transmit data required for displaying the role evaluation result screen G103 (example of evaluation information display screen) for indicating the evaluation information relating to the role of the user acquired by the evaluation information acquisition portion 355 to the game device 10 by the communication unit 33, to thereby display the role evaluation result screen G103 on the display unit 15 of the game device 10.

For example, the evaluation information display control portion 356 may be configured to transmit data including the evaluation information relating to the role of the user acquired by the evaluation information acquisition portion 355 to the game device 10 by the communication unit 33, to thereby display the role evaluation result screen G103 on the display unit 15 of the game device 10.

The evaluation information display control portion 356 is further configured to, for example, generate the role evaluation result screen G103, and transmit data on the generated role evaluation result screen G103 to the game device 10 by the communication unit 33, to thereby display the role evaluation result screen G103 on the display unit 15 of the game device 10.

The evaluation information display control unit 140 is implemented mainly by, for example, the control unit 11, the storage unit 12, and the communication unit 13 of the game device 10.

For example, the evaluation information display control unit 140 is configured to execute control for displaying the evaluation information relating to the role of the user on the display unit 15.

For example, the evaluation information display control unit 140 is configured to execute control for displaying the role evaluation result screen G103 (example of evaluation information display screen) for indicating the evaluation information relating to the role of the user acquired by the evaluation information acquisition portion 355 on the display unit 15 of the game device 10.

The evaluation information display control unit 140 may be configured to, for example, receive the data transmitted from the evaluation information display control portion 356 of the game server 30, and to display the role evaluation result screen G103 on the display unit 15 of the game device 10 based on the received data.

4. Processing Executed in Game System 1

Figure 17:
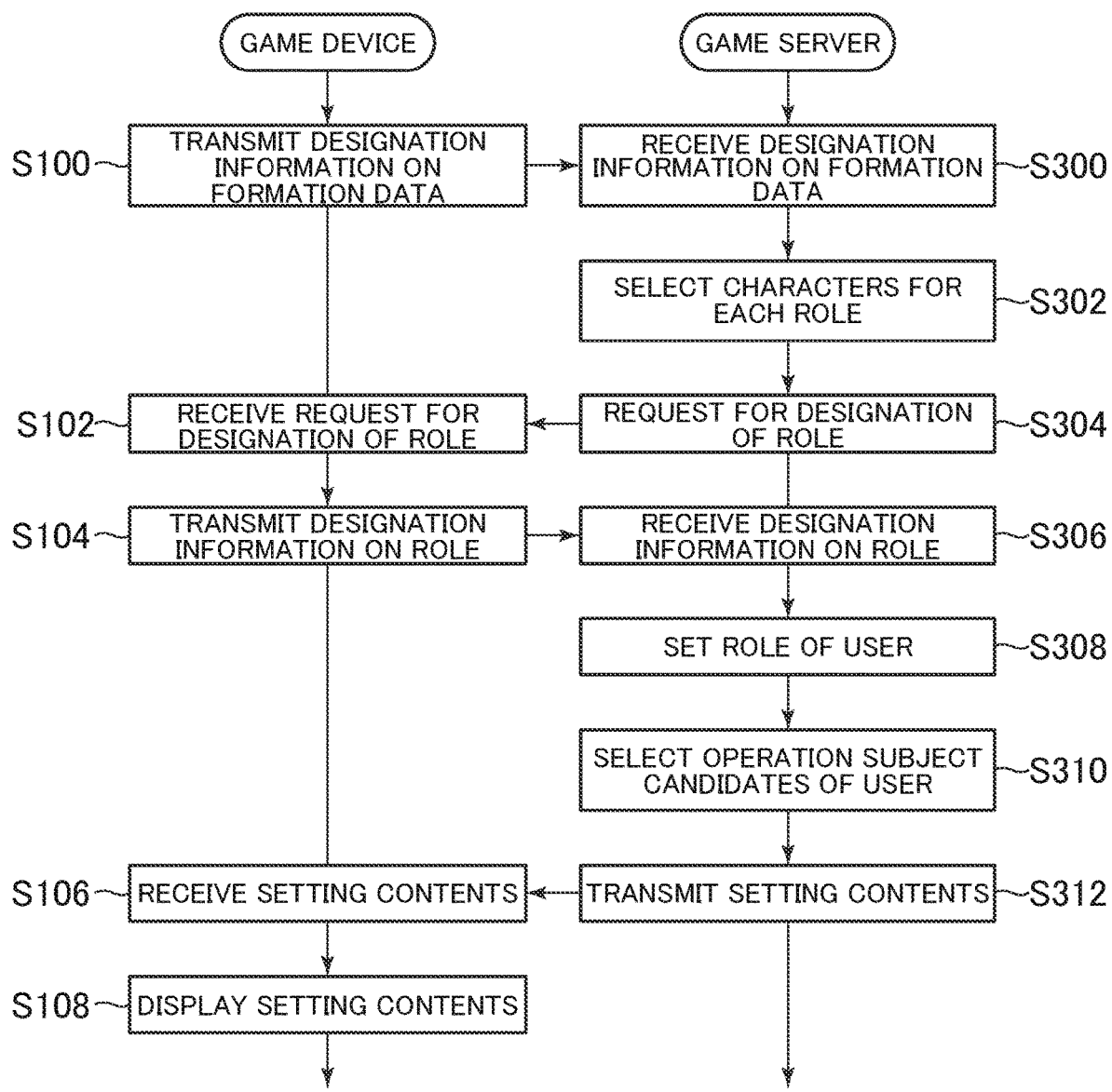
FIG. 17 is a sequence diagram of game setting control processing.
Figure 18:
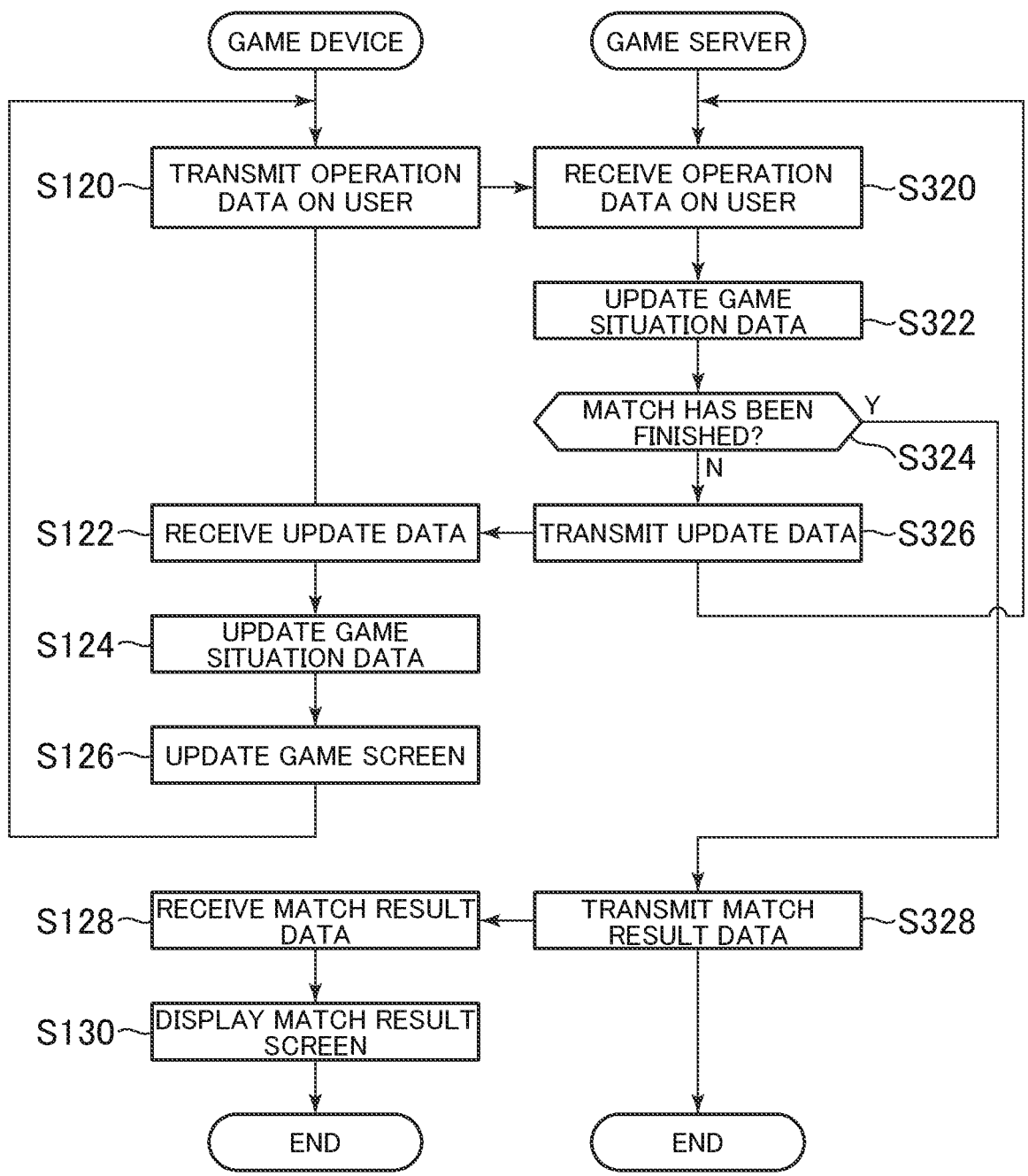
FIG. 18 is a sequence diagram of game execution control processing.

FIG. 17 and FIG. 18 are diagrams for illustrating processing executed in the game system 1. In FIG. 17 and FIG. 18, processing relating to the game device 10 is executed by the control unit 11 of the game device 10 based on the program stored in the storage unit 12, and processing relating to the game server 30 is executed by the control unit 31 of the game server 30 based on the program stored in the storage unit 32. The following description is made on the assumption that the soccer game imitating the soccer match played between the first team and the second team is executed in the game system 1. The first team is assumed to be operated by the plurality of users.

[4.1. Game Setting Control Processing]

FIG. 17 is a sequence diagram relating to an example of game setting control processing executed before the match of the soccer game is started. With the following processing, a description is made of an example of processing for setting the operation subject candidate of the user who operates the first team.

As illustrated in FIG. 17, the control unit 11 of the game device 10 transmits designation information for designating the formation data on the first team to the game server 30 by the communication unit 13 (S100). For example, the designation information for designating the formation data may be determined based on an input received from the user through the input unit 14. Further, the designation information for designating the formation data may be identification information for identifying the formation data.

The control unit 31 of the game server 30 receives the designation information on the formation data transmitted from the game device 10 by the communication unit 33 (S300).

The control unit 31 of the game server 30 selects the characters included in the first team for each of the roles, of which the plurality of users who operate the first team are respectively in charge, based on the number of users who operate the first team and the formation data designated by the designation information received in Step S300 (S302). For example, the processing of Step S302 may be executed by the basic location acquiring unit 320 and the character role setting unit 330 of the game server 30.

Subsequently, the control unit 31 of the game server 30 requests the game device 10 for the designation of the role by the communication unit 33 (S304). For example, the control unit 31 of the game server 30 may transmit the information on the plurality of roles determined based on the number of users who operate the first team to the game device 10 by the communication unit 33, and may query the game device 10 which of the roles is to be designated. When the number of users who operate the first team is, for example, three, the control unit 31 of the game server 30 may query the game device 10 which of the roles including attack, midfield, and defence is to be designated.

The control unit 11 of the game device 10 receives a request for the designation of the role from the game device 10 by the communication unit 13 (S104). For example, the control unit 11 of the game device 10 may receive the information on the plurality of roles from the game server 30 by the communication unit 13. Then, the control unit 11 of the game device 10 may display the setting screen including the information on the plurality of roles on the display unit 15, and may allow the user to input which of the roles is to be designated.

The control unit 11 of the game device 10 transmits the designation information on the role, which indicates the role designated by the user, to the game server 30 by the communication unit 13 based on the information input from the user through the input unit 14 (S104).

The control unit 31 of the game server 30 receives the designation information on the role transmitted from the game device 10 by the communication unit 33 (S306). Then, the control unit 31 of the game server 30 sets the role of the user based on the designation information on the role received from the game device 10 (S308). For example, the control unit 31 of the game server 30 may set the role of each of the plurality of users based on the designation information on the role designated by each of the plurality of users who operate the first team. In this case, the control unit 31 of the game server 30 may set different roles for the plurality of users who operate the first team. The processing of Step S308 may be executed by the user role setting unit 310 of the game server 30.

The control unit 31 of the game server 30 selects the operation subject candidates of the user based on the role of the user set in Step S308 and the information on the player characters selected for each role in Step S302 (S310). For example, the control unit 31 of the game server 30 may select the player characters selected in Step S302 as the operation subject candidates of the user for the role of the user set in Step S308.

The control unit 31 of the game server 30 transmits data on setting contents including the operation subject candidates of the user selected in Step S310 to the game device 10 by the communication unit 33 (S312).

The control unit 11 of the game device 10 receives the data on the setting contents transmitted from the game device 10 by the communication unit 13 (S106). Then, the control unit 11 of the game device 10 displays a setting display screen based on the received data on the setting contents on the display unit (S108). For example, the setting display screen G101 illustrated in FIG. 7 corresponds to an example of the setting display screen to be displayed on the display unit 15 in Step S108.

The example of the game setting control processing executed before the match of the soccer game is started has been described above. Next, an example of processing executed after the match of the soccer game is started is described.

[4.2. Game Execution Control Processing]

FIG. 18 is a sequence diagram relating to an example of game execution control processing executed after the match of the soccer game is started.

As illustrated in FIG. 18, the control unit 11 of the game device 10 transmits operation data relating to the game operation conducted by the user to the game server 30 by the communication unit 13 (S120). For example, the control unit 11 of the game device 10 may execute the transmission of the operation data on the user at a predetermined time interval (for example, every 1/30 second).

The control unit 31 of the game server 30 receives the operation data on the user transmitted from the game device 10 by the communication unit 33 (S320).

The control unit 31 of the game server 30 updates the game situation data stored in the storage unit 32 based on the operation data on the user (S322). The control unit 31 of the game server 30 may update the game situation data based on the operation data on all the users who have joined the soccer game in Step S322.

When the match is not finished (N in S324), the control unit 31 of the game server 30 transmits update data, which is used for conveying an update content of the game situation data to the game device 10, to the game device 10 by the communication unit 33 (S326). For example, the control unit 31 of the game server 30 may determine whether or not the match is finished in Step S324 based on whether or not a game time period for the match has reached a predetermined time period.

The control unit 11 of the game device 10 receives the update data transmitted from the game server 30 by the communication unit 13 (S122). Then, the control unit 11 of the game device 10 updates the game situation data stored in the storage unit 12 based on the update data received from the game server 30 (S124). Then, the control unit 11 of the game device 10 updates the game screen displayed on the display unit 15 based on the updated game situation data (S126).

Further, when the match is finished in Step S324 (Y in S324), the control unit 31 of the game server 30 generates match result data indicating the match result, and transmits the generated match result data to the game device 10 by the communication unit 33 (S328). The match result data may include, for example, the evaluation information obtained by evaluating the role of the user based on evaluations made for the plurality of characters being the operation subject candidates of the user during the match.

The control unit 11 of the game device 10 receives the match result data transmitted from the game server 30 by the communication unit 13 (S128). Then, the control unit 11 of the game device 10 displays a role evaluation result screen based on the match result data received in Step S128 on the display unit 15 (S130). The role evaluation result screen G103 illustrated in FIG. 10 is an example of the role evaluation result screen displayed on the display unit 15 in Step S130. The example of the game execution control processing executed for the match of the soccer game has been described above.

According to the game system 1 described above, a plurality of player characters are selected from among the player characters included in the first team as the player characters corresponding to each of the plurality of roles based on the basic locations of the player characters included in the first team, which are acquired based on the formation data on the first team operated by the users. Therefore, even when a formation formed without including a specific position (for example, forward) or formed by including only one player character for the specific position (for example, forward) is set as the formation of the first team, a plurality of characters are selected as the characters corresponding to the role of the user. Therefore, according to the game system 1, it is possible to avoid such an inconvenience that there exists no operation subject candidate of the user or that there exists only one operation subject candidate of the user. Further, according to the game system 1, for example, even when a formation formed without including the forward being the position dedicated to the attack is set as the formation of the first team, the user who is responsible for the role dedicated to the attack can always operate player characters.

Further, according to the game system 1, even when the characters included in the first team are operated by a plurality of users, it is possible to avoid such an inconvenience that there exist no operation subject candidates of the respective users. Further, according to the game system 1, the number of player characters to be selected as the player characters corresponding to each of the plurality of roles are set in consideration of the number of users. According to the game system 1, the number of player characters to be selected as the player characters corresponding to each of the plurality of roles can be set in accordance with the number of users. For example, when the number of users is small, the player characters corresponding to each of the plurality of roles can be selected so that each user can operate as many player characters as possible. That is, according to the game system 1, when the player characters of the first team are divided into a plurality of roles to cause a plurality of users to take charge of the respective plurality of roles when operating the player characters, it is possible to allow any user to operate two or more player characters without depending on the formation of the first team. With this configuration, it is possible to prevent the numbers of player characters to be operated by the plurality of users who operate the first team from becoming greatly unbalanced depending on the selection of the formation of the first team.

Further, according to the game system 1, the player characters corresponding to each of the plurality of roles are selected based on the distances between the goal Gb to be aimed at by the first team and the basic locations of the player characters included in the first team. That is, the order information on the player characters included in the first team is set based on the distances, and the characters corresponding to each of the plurality of roles are selected based on the order information. That is, the player characters that are suitable for being responsible for each role are selected as the player characters corresponding to each of the plurality of roles based on the order information. As a result, the player characters suitable for the role of the user are selected as the operation subject candidates of the user, which allows the user to operate the player character suitable for his/her own role. That is, the user easily conducts the gameplay in conformity with his/her own role.

Further, according to the game system 1, when the match is finished, the evaluation information relating to the role of the user achieved in the match is displayed on the role evaluation result screen, which allows the user to know whether or not the user has successfully played the role (namely, how much his/her own role was played). As a result, it is possible to further motivate the user to conduct the gameplay in conformity with his/her own role during the match, and to guide the user to conduct the gameplay in conformity with his/her own role during the match.

5. Modification Example

The present invention is not limited to the embodiment described above.

<1> For example, one of a plurality of game devices 10 may be configured to function as the game server 30. In this case, the game device 10 functioning as the game server 30 may include the functions of the game server 30 illustrated in FIG. 11. That is, the game device 10 functioning as the game server 30 (example of the game control device) may include the data storage unit 300, the user role setting unit 310, the basic location acquiring unit 320, the character role setting unit 330, the operation subject candidate selection unit 340, and the game execution unit 350.

An example of the game execution control processing executed by the plurality of game devices 10 in this case is described below. The game execution control processing described below corresponds to the game execution control processing illustrated in FIG. 18.

Figure 19:
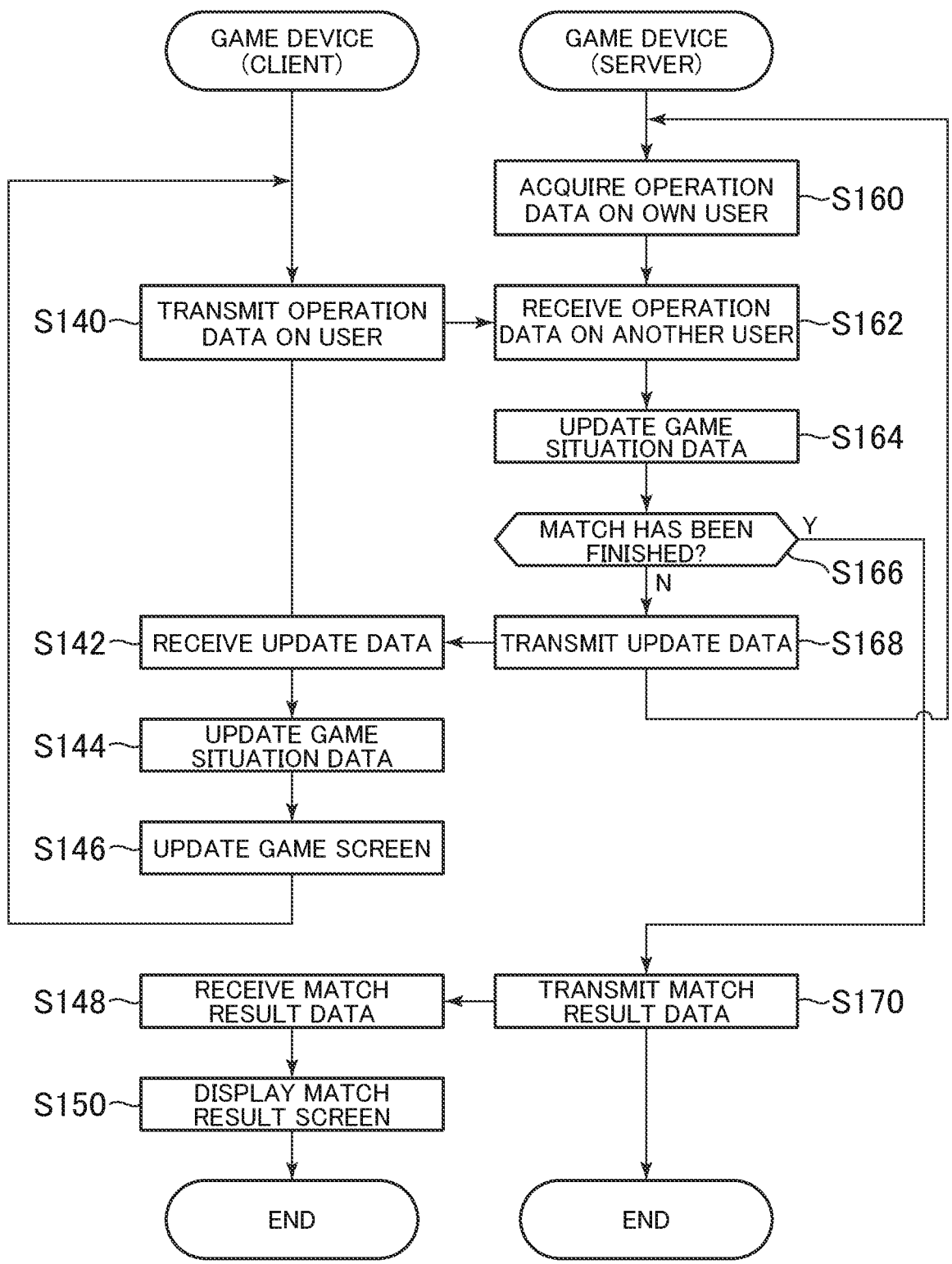
FIG. 19 is a sequence diagram of the game execution control processing.

FIG. 19 is a sequence diagram relating to an example of the game execution control processing executed by the plurality of game devices 10. In FIG. 19, communication processing conducted between the game device 10 functioning as the game server 30 and the game device 10 functioning as a client is described as an example.

As illustrated in FIG. 19, the control unit 11 of the game device 10 functioning as the client transmits the operation data relating to the game operation conducted by the user to the game device 10 functioning as the game server 30 by the communication unit 13 (S140). For example, the control unit 11 of the game device 10 functioning as the client may execute the transmission of the operation data on the user at a predetermined time interval (for example, every 1/30 second).

The control unit 11 of the game device 10 functioning as the game server 30 acquires the operation data relating to the game operation input by the own user through the input unit 14 (S160), and further receives the operation data on the user transmitted from the game device 10 functioning as the client by the communication unit 13 (S162).

The control unit 11 of the game device 10 functioning as the game server 30 updates the game situation data stored in the storage unit 12 based on the operation data on the user (S164). The control unit 11 of the game device 10 functioning as the game server 30 may update the game situation data based on the operation data on all the users who have joined the soccer game in Step S64.

When the match is not finished (N in S166), the control unit 11 of the game device 10 functioning as the game server 30 transmits the update data, which is used for conveying the update content of the game situation data to the game device 10, to the game device 10 functioning as the client by the communication unit 13 (S168). For example, the control unit 11 of the game device 10 functioning as the game server 30 may determine whether or not the match is finished in Step S166 based on whether or not the game time period for the match has reached the predetermined time period.

The control unit 11 of the game device 10 functioning as the client receives the update data transmitted from the game device 10 functioning as the game server 30 by the communication unit 13 (S142). Then, the control unit 11 of the game device 10 functioning as the client updates the game situation data stored in the storage unit 12 based on the update data received from the game device 10 functioning as the game server 30 (S144). Then, the control unit 11 of the game device 10 functioning as the client updates the game screen displayed on the display unit 15 based on the updated game situation data (S146).

Further, when the match is finished in Step S166 (Y in S166), the control unit 11 of the game device 10 functioning as the game server 30 generates the match result data indicating the match result, and transmits the generated match result data to the game device 10 functioning as the client by the communication unit 13 (S170). The match result data may include, for example, the evaluation information obtained by evaluating the role of the user based on evaluations made for the plurality of characters being the operation subject candidates of the user during the match.

The control unit 11 of the game device 10 functioning as the client receives the match result data transmitted from the game device 10 functioning as the game server 30 by the communication unit 13 (S148). Then, the control unit 11 of the game device 10 functioning as the client displays the role evaluation result screen based on the match result data received in Step S148 on the display unit 15 (S150).

According to the game devices 10 described above, the soccer game imitating the soccer match played between the first team and the second team can be executed by a peer-to-peer method.

<2> Further, for example, control may be conducted so as not to change the characters selected for the role of the user even when there are changes in the positions of the characters included in the first character group, the formation of the first character group, or the strategy during the sport match played between the first character group operated by the users and the second character group, which is executed in the game system 1.

<3> Further, for example, control may be conducted so as not to change the characters selected for the role of the user even when the number of characters being operated by the user becomes one or less as a result of the character selected for the role of the user leaving the field during the sport match played between the first character group operated by the users and the second character group, which is executed in the game system 1.

<4> The case where the game is executed in the game system 1 including the plurality of game devices 10 has been described above, but the game may be executed by one game device 10 (standalone game device 10) connected to a plurality of game controllers. That is, the present invention may be applied to a game to be joined by a plurality of users who respectively operate the plurality of game controllers connected to the standalone game device 10.

For example, the soccer game described above may be executed on the standalone game device 10 connected to the plurality of game controllers. Further, in the soccer game executed in this case, for example, a soccer match may be played between the first team operated in cooperation by a plurality of users who respectively operate the plurality of game controllers connected to the standalone game device 10 and the second team of a match opponent.

In such a case, all the functional blocks illustrated in FIG. 11 are implemented by the standalone game device 10 (example of the game control device). That is, the above-mentioned standalone game device 10 also includes the functional blocks that are illustrated in FIG. 11 as being included in the game server 30. In short, the above-mentioned standalone game device includes the role designation receiving unit 100, the formation designation receiving unit 110, the operation receiving unit 120, the game screen display control unit 130, the evaluation information display control unit 140, the data storage unit 300, the user role setting unit 310, the basic location acquiring unit 320, the character role setting unit 330, the operation subject candidate selection unit 340, and the game execution unit 350. In this case, the game screen display control unit 130 and the game screen display control portion 354 are combined into one functional block. In the same manner, the evaluation information display control unit 140 and the evaluation information display control portion 356 are combined into one functional block.

In this case, the role designation receiving unit 100 of the standalone game device 10 may be configured to receive the designation of the role of the user corresponding to each of the plurality of game controllers based on an input received from each of the plurality of game controllers connected to the game device 10.

Further, the formation designation receiving unit 110 of the standalone game device 10 may be configured to receive the designation of the formation of the first team based on an input received from the game controller corresponding to one of the plurality of users who operate the first team in cooperation (namely, one specific game controller among the plurality of game controllers connected to the game device 10).

Further, the operation receiving unit 120 of the standalone game device 10 may be configured to receive the operation input conducted by each of the plurality of users from each of the plurality of game controllers connected to the game device 10.

<5> Further, the case where the present invention is applied to the soccer game configured so that the soccer match is played between the first team and the second team has been described above, but the present invention may be applied to a game other than the soccer game. The present invention may be applied to the game of the sport match played between the first character group operated in cooperation by the plurality of users and the second character group. Therefore, the present invention may also be applied to, for example, a basketball game, an ice hockey game, a rugby game, or an American football game.

<6> Further, for example, the above-mentioned embodiment and the above-mentioned modification examples <1> to <5> may be combined appropriately.

6. Supplementary Notes

From the description given above, the present invention is understood as follows, for example. In order to facilitate understanding of the present invention, the reference symbols provided in the drawings are enclosed in parentheses and assigned to components appropriately. However, the present invention is not to be limited to the modes illustrated in the drawings as a result of this.

There is provided a game system including at least one processor configured to: execute a sports game based on a first character group operated by a user and a second character group; set any one of a plurality of roles as a role to be played by the user in a match; acquire basic locations of first characters included in the first character group based on formation data on the first character group; set a plurality of the first characters corresponding to each of the plurality of roles based on the basic locations of the first characters; select a plurality of operation subject candidates from among the first characters based on the role of the user and a setting of the plurality of the roles; switch an operation subject of the user among the plurality of operation subject candidates during the match; and cause the operation subject of the user to act based on the user's operation during the match.

There is provided a controlling method of a game system including: executing a sports game based on a first character group operated by a user and a second character group; setting any one of a plurality of roles as a role to be played by the user in a match; acquiring basic locations of first characters included in the first character group based on formation data on the first character group; setting a plurality of the first characters corresponding to each of the plurality of roles based on the basic locations of the first characters; selecting a plurality of operation subject candidates from among the first characters based on the role of the user and a setting of the plurality of the roles; switching an operation subject of the user among the plurality of operation subject candidates during the match; and causing the operation subject of the user to act based on the user's operation during the match.

There is provided a game control device comprising at least one processor configured to: execute a sport game based on a first character group operated by a user and a second character group; set any one of a plurality of roles as a role to be played by the user in a match; acquire basic locations of first characters included in the first character group based on formation data on the first character group; set a plurality of the first characters corresponding to each of the plurality of roles based on the basic locations of the first characters; and select a plurality of operation subject candidates from among the first characters based on the role of the user and a setting of the plurality of the roles.

There is provided a controlling method of a game control device: executing a sport game based on a first character group operated by a user and a second character group;

setting any one of a plurality of roles as a role to be played by the user in a match; acquiring basic locations of first characters included in the first character group based on formation data on the first character group; setting a plurality of the first characters corresponding to each of the plurality of roles based on the basic locations of the first characters; and selecting a plurality of operation subject candidates from among the first characters based on the role of the user and a setting of the plurality of the roles.

A program according to one embodiment of the present invention is a program for causing a computer to function as the game system described above or as the game control device described above.

An information storage medium according to one embodiment of the present invention is a computer-readable information storage medium having the program described above recorded thereon.

According to one aspect of the present invention, the sports game being a game configured so that the first character group makes a score if a moving object moves into within a first region; and the at least one processor setting the first characters corresponding to each of the plurality of roles based on distances between the first region and the basic locations of the first characters.

According to one aspect of the present invention, the sports game being a game configured so that the second character group makes a score if a moving object moves into within a second region; and the at least one processor setting the first characters corresponding to each of the plurality of roles based on distances between the second region and the basic locations of the first characters.

According to one aspect of the present invention, the at least one processor: setting order information of the first characters based on the distances; and setting the first characters corresponding to each of the plurality of roles based on the order information.

According to one aspect of the present invention, the at least one processor: acquiring, if the match is finished, first evaluation information relating to the role of the user in the match based on second evaluation information on the first characters corresponding to the role achieved in the match; and executing control for displaying the first evaluation information on a display.

According to one aspect of the present invention, the first characters being operated by a plurality of users and the at least one processor: setting any one of the plurality of roles as the role to be played by the user in the match for each of the plurality of users; selecting the plurality of operation subject candidates for each of the plurality of users; and determining the number of first characters to be selected as the first characters corresponding to each of the plurality of roles based on the number of the plurality of users; and setting the determined number of first characters corresponding to each of the plurality of roles based on a result of the determination.

What is claimed is:

1. A game system comprising at least one processor configured to:
   execute a sports game based on a first character group operated by a user and a second character group;
   set any one of a plurality of roles as a role to be played by the user in a match, the plurality of roles being different from positions of first characters included in the first character group;
   acquire basic locations of the first characters based on formation data on the first character group;
   set, for every role, a plurality of the first characters corresponding to a role based on the basic locations of the first characters;
   select a plurality of operation subject candidates of the user based on the first characters corresponding to the user's role that are different from the positions of the first characters;
   switch an operation subject of the user among the plurality of operation subject candidates during the match; and
   cause the operation subject of the user to act based on the user's operation during the match,
   acquiring, if the match is finished, first evaluation information relating to the role of the user in the match based on second evaluation information on the first characters corresponding to the role achieved in the match; and
   executing control for displaying the first evaluation information on a display.

2. The game system according to claim 1,
   the sports game being a game configured so that the first character group makes a score if a moving object moves into within a first region; and
   the at least one processor setting the first characters corresponding to each of the plurality of roles based on distances between the first region and the basic locations of the first characters.

3. The game system according to claim 1,
   the sports game being a game configured so that the second character group makes a score if a moving object moves into within a second region; and
   the at least one processor setting the first characters corresponding to each of the plurality of roles based on distances between the second region and the basic locations of the first characters.

4. The game system according to claim 2, the at least one processor:
   setting order information of the first characters based on the distances; and
   setting the first characters corresponding to each of the plurality of roles based on the order information.

5. The game system according to claim 1,
   wherein the first evaluation information indicates how much the plurality of player characters selected as the player characters corresponding to the role operated in conformity with the role.

6. The game system according to claim 1,
   the first characters being operated by a plurality of users and the at least one processor:
   setting any one of the plurality of roles as the role to be played by the user in the match for each of the plurality of users;
   selecting the plurality of operation subject candidates for each of the plurality of users;
   determining the number of first characters to be selected as the first characters corresponding to each of the plurality of roles based on the number of the plurality of users; and
   setting the determined number of first characters corresponding to each of the plurality of roles based on a result of the determination.

7. The game system according to claim 1, further comprising a plurality of game devices respectively operated by each of a plurality of users and a game server,
   the plurality of the game devices and the game server being connected to a network, any one of the plurality of the game devices and the game server including the at least one processor, and the at least one processor being operable to receiving operation data relating to the operation subject from each of the plurality of the game devices by selecting the plurality of operation subject candidates for each of the plurality of the users.

8. A game control device comprising at least one processor configured to:

execute a sport game based on a first character group operated by a user and a second character group;

set any one of a plurality of roles as a role to be played by the user in a match, the plurality of roles being different from positions of first characters included in the first character group;

acquire basic locations of the first characters based on formation data on the first character group;

set, for every role, a plurality of the first characters corresponding to a role based on the basic locations of the first characters; and select a plurality of operation subject candidates of the user based on the first characters corresponding to the user's role that are different from the positions of the first characters, acquire, if the match is finished, first evaluation information relating to the role of the user in the match based on second evaluation information on the first characters corresponding to the role achieved in the match; and execute control for displaying the first evaluation information on a display.

9. A non-transitory computer-readable information storage medium having a program for causing a computer to:

execute a sport game based on a first character group operated by a user and a second character group;

set any one of a plurality of roles as a role to be played by the user in a match, the plurality of roles being different from positions of first characters included in the first character group;

acquire basic locations of the first characters based on formation data on the first character group; and set, for every role, a plurality of the first characters corresponding to a role based on the basic locations of the first characters;

select a plurality of operation subject candidates based on the first characters corresponding to the user's role that are different from the positions of the first characters, acquire, if the match is finished, first evaluation information relating to the role of the user in the match based on second evaluation information on the first characters corresponding to the role achieved in the match; and execute control for displaying the first evaluation information on a display.

* * * * *